United States Patent
Carley et al.

(10) Patent No.: US 8,328,582 B1
(45) Date of Patent: Dec. 11, 2012

(54) SHORTENED ADAPTER FOR LIGHT BULB SOCKETS WITH MINIATURE REMOTE CONTROLLER

(75) Inventors: Adam L Carley, Windham, NH (US); Anthony D D'Amelio, Andover, MA (US); James Edward Mandry, N. Andover, MA (US); Daniel J Allen, Derry, NH (US); Leonard R Weisberg, Alexandria, VA (US)

(73) Assignee: MagicLux, LLC, Hudson, NH (US)

( * ) Notice: Subject to any disclaimer, the term of this patent is extended or adjusted under 35 U.S.C. 154(b) by 401 days.

(21) Appl. No.: 12/694,685

(22) Filed: Jan. 27, 2010

Related U.S. Application Data

(60) Provisional application No. 61/148,994, filed on Feb. 1, 2009.

(51) Int. Cl.
*H01R 25/00* (2006.01)
(52) U.S. Cl. ........................................ 439/642
(58) Field of Classification Search .......... 439/642, 439/641
See application file for complete search history.

(56) References Cited

U.S. PATENT DOCUMENTS

| | | | | | |
|---|---|---|---|---|---|
| 1,605,800 | A | * | 11/1926 | Vogt | 200/51.02 |
| 1,854,842 | A | * | 4/1932 | Huppert | 337/92 |
| 2,037,653 | A | * | 4/1936 | Fow | 439/642 |
| 2,177,806 | A | * | 10/1939 | Kamm | 337/15 |
| 2,218,173 | A | * | 10/1940 | Kulka | 439/642 |
| 2,222,655 | A | * | 11/1940 | Dulberg | 200/51.03 |
| 2,244,044 | A | * | 6/1941 | Bishop | 337/266 |
| 2,546,554 | A | | 3/1951 | McElroy | |
| 3,028,523 | A | | 4/1962 | Seid | |
| 3,070,767 | A | | 12/1962 | Rabinow | |
| 3,248,534 | A | * | 4/1966 | Walters et al. | 362/147 |
| 3,392,293 | A | | 7/1968 | DeBoo et al. | |
| 3,420,552 | A | | 1/1969 | Mork | |
| 3,433,967 | A | * | 3/1969 | Bernheim | 250/239 |
| 3,452,215 | A | | 6/1969 | Alessio | |
| 3,496,451 | A | | 2/1970 | Duncan | |
| 3,517,259 | A | | 6/1970 | Dotto | |
| 3,543,088 | A | | 11/1970 | Garrett | |
| 3,781,593 | A | | 12/1973 | Rodriguez | |

(Continued)

OTHER PUBLICATIONS

Lutron Maestro Wireless RF Digital Fade Dimmers—product brochure, product information for product that was available prior to Feb. 1, 2009.

(Continued)

*Primary Examiner* — Gary F. Paumen
(74) *Attorney, Agent, or Firm* — Edell, Shapiro & Finnan, LLC

(57) ABSTRACT

A shortened adapter for a light bulb socket with highly overlapped male and female parts with an insulating hand-ring that extends only partially over the external surface of the adapter's female threading so it fits into the unthreaded collar of a light bulb socket, thereby significantly reducing the light bulb displacement. The shortened adapter can respond to an incoming signal and control the output of a light bulb. A reversible ring on the insulating hand-ring can change the adapter from being a dimmer to being an on-off control. A mechanism is disclosed to reversibly lock the adapter onto a light bulb. A miniature remote controller to work with the adapter is provided that has many advantages because of its very small size and compact shape. Further, one such controller can control several lights and several such controllers can control a single light in arbitrary combinations selected by the user.

20 Claims, 12 Drawing Sheets

U.S. PATENT DOCUMENTS

| | | | |
|---|---|---|---|
| 3,893,019 | A | 7/1975 | King et al. |
| 4,023,035 | A | 5/1977 | Rodriguez |
| 4,754,255 | A | 6/1988 | Sanders et al. |
| 5,068,576 | A | 11/1991 | Hu et al. |
| 5,121,287 | A | 6/1992 | Lee |
| 5,463,286 | A | 10/1995 | D'Aleo et al. |
| 5,731,663 | A * | 3/1998 | Davis ............................ 315/194 |
| 5,744,913 | A | 4/1998 | Martich et al. |
| 6,188,810 | B1 | 2/2001 | Baney |
| 6,218,787 | B1 | 4/2001 | Murcko et al. |
| 6,340,864 | B1 | 1/2002 | Wacyk |
| 6,727,665 | B2 | 4/2004 | Yao |
| 6,828,733 | B1 | 12/2004 | Crenshaw |
| 6,906,477 | B2 | 6/2005 | Kazanov et al. |
| 7,106,261 | B2 | 9/2006 | Nagel et al. |
| 7,556,398 | B2 * | 7/2009 | Van Der Poel ................ 362/227 |
| 7,597,452 | B2 | 10/2009 | Jeng et al. |
| 7,633,230 | B2 | 12/2009 | Ribarich |
| 7,659,674 | B2 | 2/2010 | Mueller et al. |
| 2003/0016119 | A1 | 1/2003 | Teich |
| 2005/0155942 | A1 | 7/2005 | Viola |
| 2005/0231134 | A1 | 10/2005 | Sid |
| 2005/0236998 | A1 | 10/2005 | Mueller et al. |
| 2007/0176766 | A1 | 8/2007 | Cheng |
| 2007/0188103 | A1 | 8/2007 | Ribarich |
| 2008/0111491 | A1 | 5/2008 | Spira |
| 2008/0316047 | A1 | 12/2008 | De Goederen-Oei et al. |
| 2009/0059603 | A1 | 3/2009 | Recker et al. |
| 2009/0256489 | A1 | 10/2009 | Morales et al. |

OTHER PUBLICATIONS

Convert-A-bulb, product information for product that was available prior to Feb. 1, 2009.
Medium Base to Medium Base Porcelain Socket Extender, product information for product that was available prior to Feb. 1, 2009.
3093A New Ford Remote Head Key with 12 month warranty, product information for product that was available prior to Feb. 1, 2009.
TCP Plastic Mold Medium to Medium CFL Socket Extender, product information for product that was available prior to Feb. 1, 2009.
SuperSwitch, product information for product that was available prior to Feb. 1, 2009.
Screw-In Universal Touch Full Range Dimmer, product information for product that was available prior to Feb. 1, 2009.
X10 Socketrocket Compact Screw-In Lamp Module, product information for product that was available prior to Feb. 1, 2009.
PHW04D Slim RF Wall Transmitter Remote Control, product information for product that was available prior to Feb. 1, 2009.
ZigBee Home Automation Certified Products, product information for product that was available prior to Feb. 1, 2009.
Aurex—Wireless Lighting Dimmer Switch, product information for product that was available prior to Feb. 1, 2009.
Bye Bye Standby Wall Dimmer Switch, product information for product that was available prior to Feb. 1, 2009.
Carlon Wireless Light Socket Switch, product information for product that was available prior to Feb. 1, 2009.
Lutron Maestro Wireless Controller, product information for product that was available prior to Feb. 1, 2009.
Lutron Maestro Wireless Dimmer, product information for product that was available prior to Feb. 1, 2009.
HandySwitch—The Wireless light switch, product information for product that was available prior to Feb. 1, 2009.
Button Flasher, product information for product that was available prior to Feb. 1, 2009.
Intermediate Base Socket Reduced to Candelabra Base Socket, product information for product that was available prior to Feb. 1, 2009.
Leviton Brand, FAT BOY Socket w/ Full Range Dimmer, product information for product that was available prior to Feb. 1, 2009.
Lutron Maestro Wireless, Wireless Control with Preset Button, Installation Instructions, product information for product that was available prior to Feb. 1, 2009.
Lutron Stanza Lamp Socket Dimmer/Switch, Wireless Lighting Control, Product Description and Installation Notes, product information for product that was available prior to Feb. 1, 2009.
Super Switch Wireless Remote Control Datasheet, eForCity, 2008, Retrieved on Jul. 30, 2011.
Super Switch Datesheet firstSTREET, 2009, Retrieved on Jul. 30, 2011.
Office Action in co-pending U.S. Appl. No. 12/694,733, mailed Aug. 29, 2011.
Office Action in co-pending U.S. Appl. No. 12/694,733, mailed 7, 2012.

* cited by examiner

SHORTENED ADAPTER FOR LIGHT BULB SOCKETS WITH MINIATURE REMOTE CONTROLLER

CROSS-REFERENCE TO RELATED APPLICATIONS

This application claims the benefit of U.S. Provisional Patent Application No. 61/148,994, filed Feb. 1, 2009, the entirety of which is incorporated herein by reference.

This application is also related to U.S. patent application filed on even date and entitled "System for Light and Appliance Remote Control," Ser. No. 12/694,733, the entirety of which is incorporated herein by reference.

TECHNICAL FIELD

This disclosure relates to an adapter for light bulb sockets that provides a significantly shortened bulb displacement, includes means to change its function and to dim a light bulb, and a miniature remote controller that provides control of the adapter's output.

BACKGROUND

Adapters to extend light bulb sockets ("extenders") are broadly commercially available. However, there are some conditions under which a shortened (smaller bulb displacement) extender is required, such as within a recessed light bulb socket having a glass cover. Extenders that are currently available are not short enough for such particular applications.

There are also adapters for light bulb sockets that allow the control of the intensity of a light bulb. For these types of adapters, a shortened adapter is very desirable since it minimizes the need to change the lamp assembly to incorporate the adapter. Examples include adapters used in a recessed lamp assembly in a ceiling fixture having a glass cover, or used in a table lamp having a harp that holds a shade for which the harp is too short to accommodate the adapter plus the light bulb.

In many versions of adapters, the electronic circuitry used to control a light bulb is incorporated within the adapter, in some configurations within the insulator that surrounds the female part of the adapter. Versions of these adapters are commercially available such as those manufactured by Lutron Electronics, Inc., and can incorporate, for example, switches, photocells, and motion sensors, together with their related electronic circuitry. The problem with these adapters is that the incorporation of the electronic circuitry within the adapter significantly increases the length of the adapter.

SUMMARY

An adapter for a light bulb socket is disclosed with highly overlapping male and female parts wherein an insulator surrounding a female part of the adapter covers only a relatively small fraction of the exterior portion of the female part, thereby leaving a substantial portion (e.g. ⅗) of the exterior of the female part bare or covered by a very thin insulator. Accordingly, the displacement of the bottom electrical contact of the light bulb above the bottom electrical contact of the light bulb socket by the adapter is thereby reduced to about 0.5 inches, a displacement below that heretofore known.

Further, the use of a reversible ring at the top of the adapter is disclosed that allows the adapter to be changed from a dimmer to an on-off device. The use of a reversible ring to change the function (or purpose) of an electrical device, including an adapter for a light bulb socket, has not been heretofore disclosed.

The present disclosure also describes means for reversibly locking the adaptor onto a light bulb.

Additionally, a miniature remote controller (a transmitter) is disclosed configured to control at least one light or fan or similar appliance. The remote controller transmits signals to a device, such as the adapter described herein, to control the appliance, or electronics are incorporated within a light or fan or similar appliance. The miniature remote controller is not intended to be hand-held and is sufficiently small to be attached to places heretofore not found to be practical. There are no remote controllers heretofore known that are configured so small as to discourage hand-held use, and none configured, for example, to be attachable to or under the edge of a table or under the arm of an arm chair, and none configured to be small enough that multiple controllers can be placed in close proximity to each other at a single relatively small location. Further, one miniature remote controller can control multiple adapters, and one adapter can be controlled by multiple miniature remote controllers, as will be apparent from the following.

BRIEF DESCRIPTION OF THE DRAWINGS

The invention will be described in further detail with references to the accompanying drawings, in which.

DETAILED DESCRIPTION

The following terms are used in the following descriptions and their meanings are designated as follows. "Adapter" herein refers to a device that is inserted into a light bulb socket and is used to control the output of a light bulb. It also includes a simple extender which raises a light bulb in its socket and powers it continuously. "Adapter" also can include a dummy adapter which makes no electrical connection to the light bulb at all. A dummy adapter would be used to disable a particular bulb in place or to protect or child-proof a socket.

The dimension of merit for an adapter here is the bulb displacement, not any adapter dimension per se. Bulb displacement is the amount the bottom electrical contact of a light bulb is raised above the bottom electrical contact of the light bulb socket by the adapter. The term "shortened adapter" refers to an adapter that provides a shortened bulb displacement.

"Light bulb" includes but is not limited to an incandescent light bulb, a non-dimmable or dimmable compact fluorescent light, and a non-dimmable or dimmable light emitting diode (LED) bulb.

Figure 1:
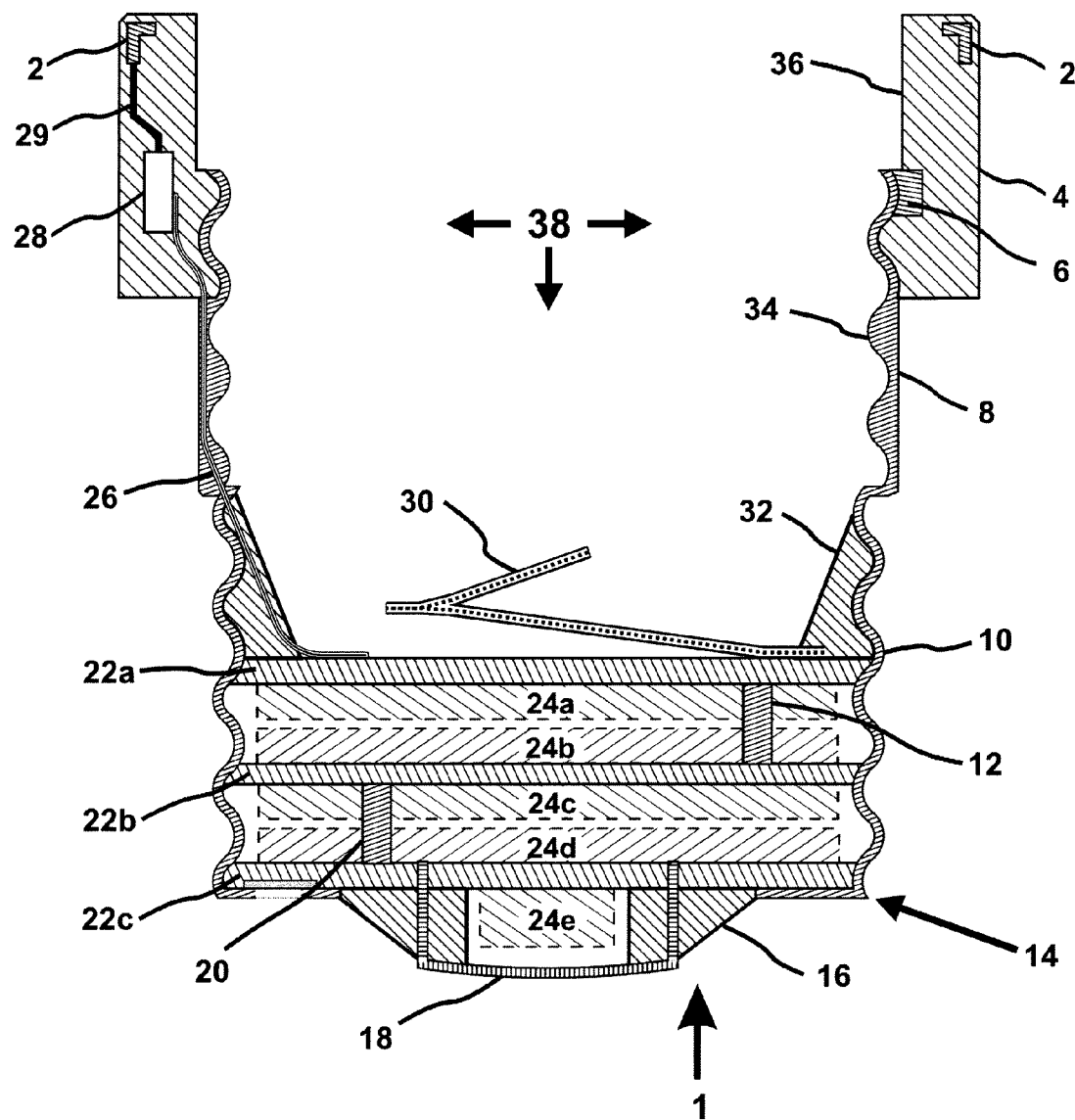
FIG. 1 is a cross-sectional view of the adapter without a reversible ring.
Figure 2A:
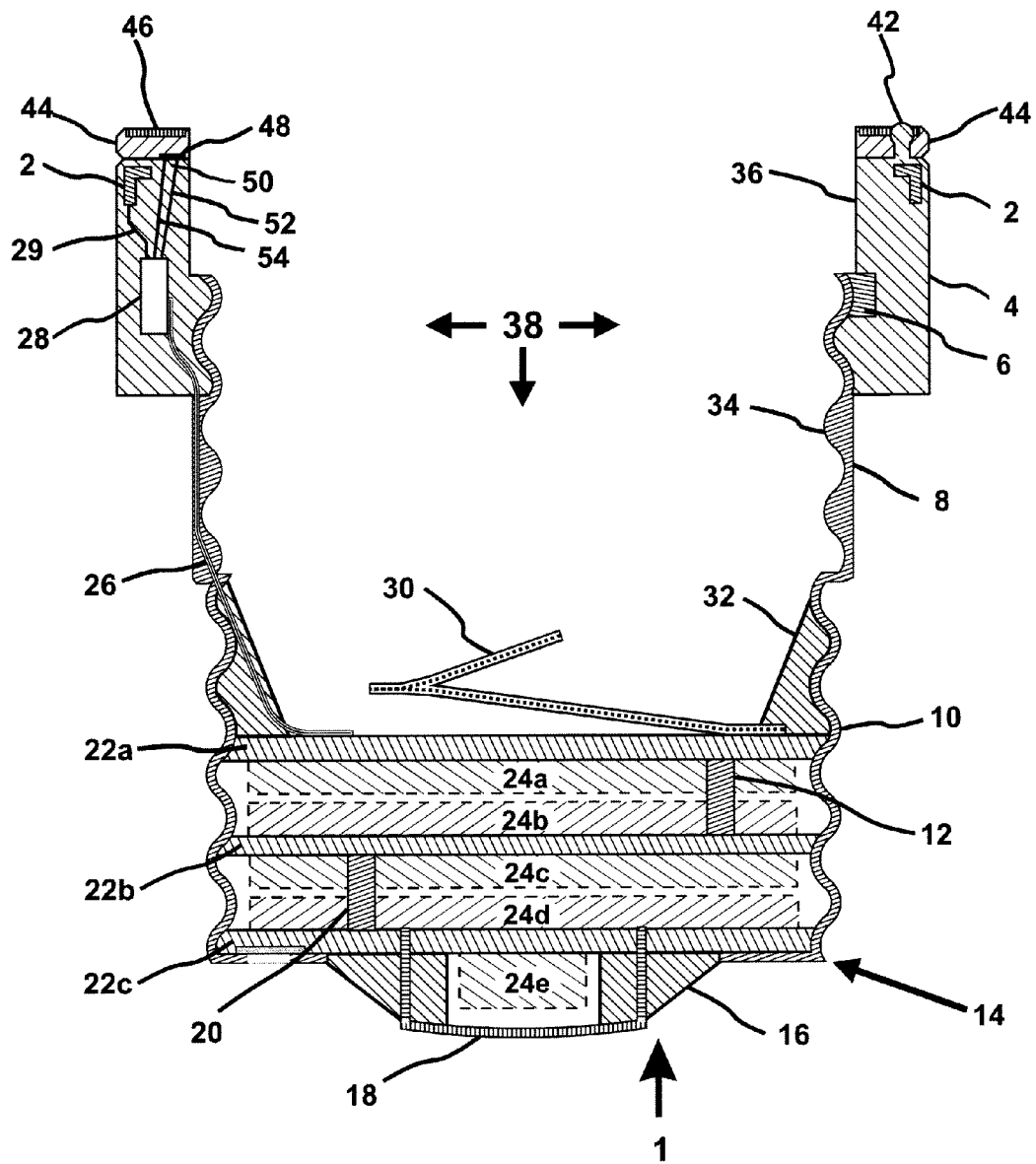
FIG. 2A is a cross-sectional view of the adapter with a reversible ring.
Figure 2B:
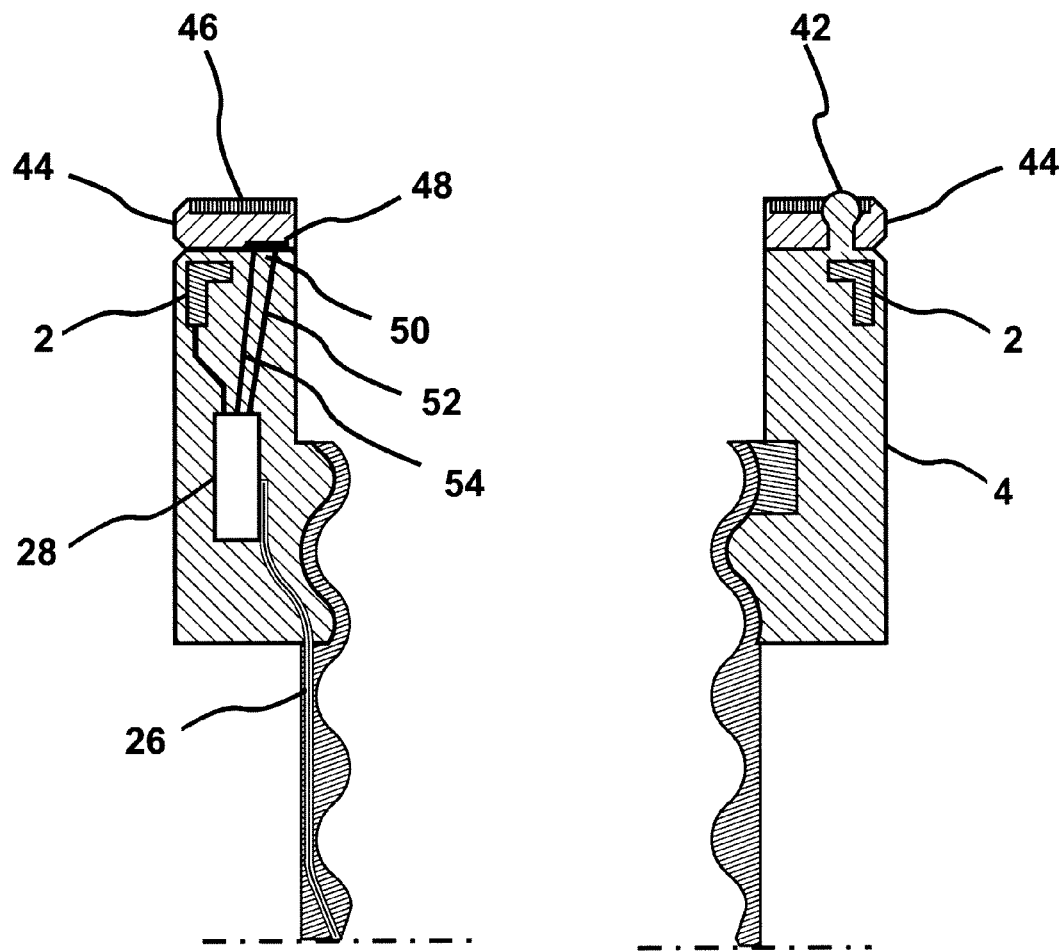
FIG. 2B is a magnified cross-sectional view of the upper part of the adapter with a reversible ring shown in FIG. 2A.
Figure 3:
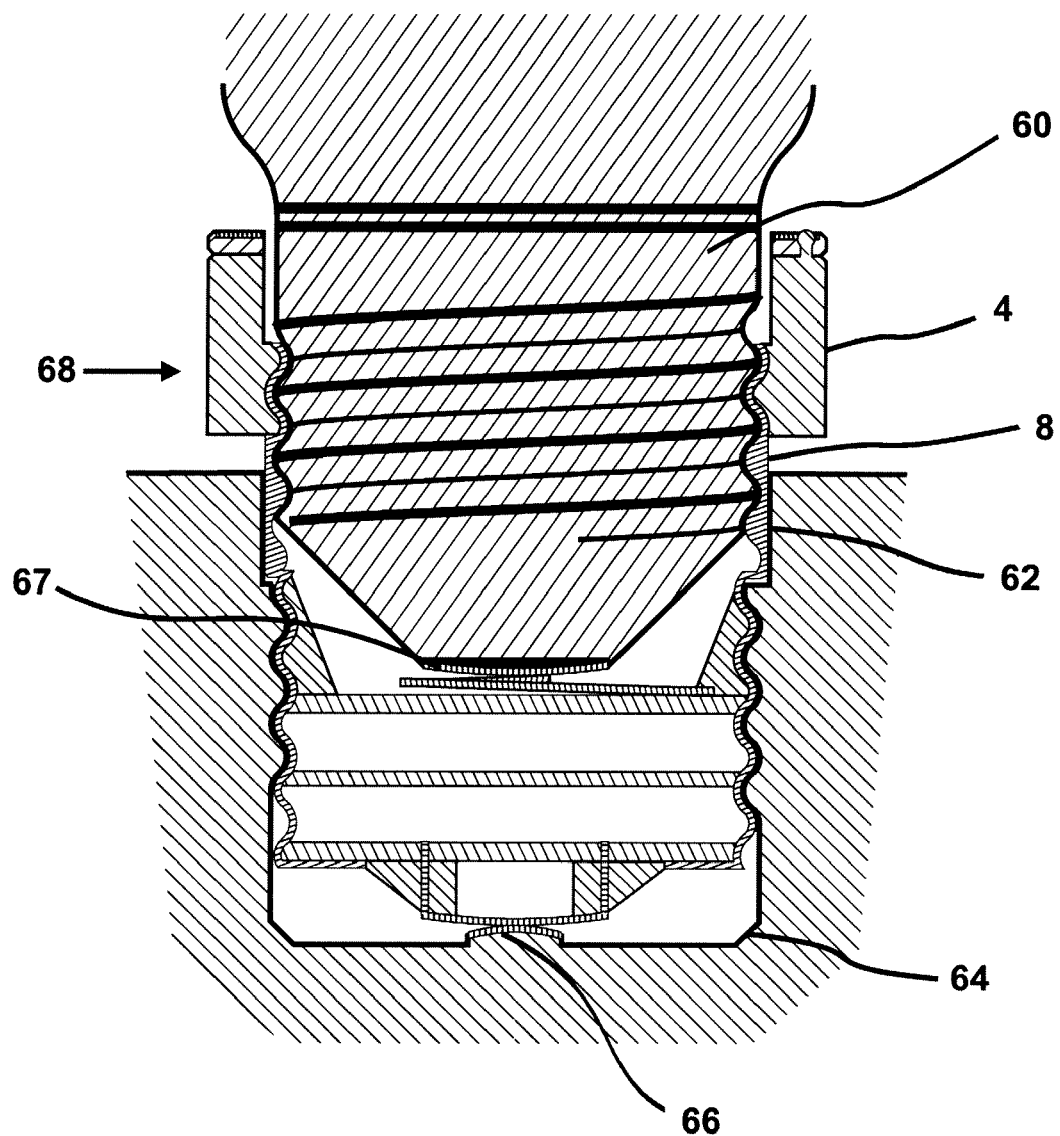
FIG. 3 shows the adapter in use.

Terms such as "vertical," "height," "upper," "lower," "top," and "bottom" refer to the axial dimension when the device is in the orientation of FIGS. 1, 2, and 3. This usage is for simplicity of description and is not intended to preclude using the device in other orientations.

"Socket" or "female socket" refers to the entire cavity into which a light bulb is inserted. While "socket" in colloquial usage may also refer to any of various units having such a cavity; herein only the cavity itself is referred to. A female socket has at its bottom a center contact which electrically contacts the corresponding center contact of a bulb fully screwed into the socket.

In FIGS. 1, 2A, and 3, the female socket incorporates a folded-spring center contact 30. "Folded" herein refers to the span of the spring doubling back on itself at least once, not necessarily literal folding, thereby providing greater axial flexing range without special spring materials. In this embodiment, the required axial range is over 0.135 inches, whereas a standard socket single-span spring travels no more than 0.125 inches without becoming permanently bent. The reason the adapter is configured with such a large range is to accommodate all light bulb bases meeting industry standards. An alternative to a folded spring is a spring-loaded plunger of the type used in some sockets and some light bulb bases.

The lower part of a light bulb or other device screwed into the adapter, the part which enters into the adapter's socket, is called a "light bulb base." The term "light bulb base" may refer to the base of a second adapter, e.g. a medium to candelabra adapter, screwed into the socket or other device with the same base as a light bulb. A light bulb base has three regions corresponding respectively with the three regions of the female socket with which it mates. A female socket's center contact, female threads, and upper unthreaded section, or "collar," mate respectively with a light bulb base's center contact, male threads, and male shoulder. Like the socket, the base center contact, male threads, and male shoulder refer only to the surface geometry irrespective of any components or construction beneath the surface. Male shoulders may be insulating or conducting, may be smooth or may include nonfunctional male threads or other geometries, but have no outside diameter greater than the inside diameter of a female collar. Light bulb base male threads are always conducting material, typically aluminum, brass, or plated steel.

A female socket has female threads or partial female threads which mechanically engage the corresponding male threads on a light bulb screwed into it. Herein, "threads" refers only to the surface geometry and does not include any components or construction supporting the threads. Thus, a thin threaded metal shell of the type commonly used in the manufacture of sockets has female threads on its inside and non-functional male threads on its outside. The female threads in a female socket may be insulating material or conducting material. When insulating material is used, separate means are provided for electrical contact with the light bulb base. Some of the female threads in a socket may be nonfunctional, meaning they do not engage with male threads on any regular light bulb base, and some female threads may engage some bulbs or adapters and not others due to bulb variations allowed within accepted standards.

Concerning industry standards, there are several standards for U.S. medium Edison light bulbs and sockets, such as those from ANSI (American National Standards Institute) and UL (Underwriters Laboratories Inc.®), which have evolved over the many decades since this threading was first introduced by Thomas Edison. While substantially compatible, they differ in some ways. For example, these standards allow significant variation in some variables, such as how pointed the base "nose" is. Notwithstanding these variations, not all products sold now or in the past meet all applicable standards, and it is possible to find rare cases of bases not mating properly with sockets where one would expect them to mate. Some products deliberately depart from such universal compatibility to perform a specialized function. In the embodiment of FIG. 1, the adapter mates securely with any socket or light bulb base meeting current accepted or industry standards. There may be some sockets or bases that it does not securely mate with that are very old, directed at specialized applications, or simply the product of shoddy manufacture.

Most but not all female sockets include an insulating unthreaded collar at their top, above the female threads. The function of the collar is to recess the live electrical contacts into the socket cavity and provide greater mechanical support to the bulb. The inside diameter of the collar is at least the largest inside diameter of the female threads, although some sockets have the collar substantially larger in diameter. The collar is typically one-quarter inch high for E26 medium Edison standard used in the U.S. Collars are usually made of cardboard, plastic, or porcelain. Some collars are rubber and provide a seal to exclude water from the socket.

The term "electronic components" refers to active, passive, or sensor components mounted on a printed circuit board or otherwise. This term also includes antennas and mechanical switches. The term "electronic subsystem" refers to a group of electronic components that perform an electronic function, and may include one or more printed circuit boards or a flex strip with various electronic components soldered or otherwise attached to them. "Electronic subsystems" may include parts that are geometrically separated but electrically connected and function together.

The Shortened Adapter

FIG. 1 depicts a shorted adapter according to one embodiment. The adapter 1 is depicted approximately four times actual size. It comprises the following major parts: the insulating hand ring 4 at the top, the female socket 38 having female threads 34, and the male base 14 having male threads 10. The female threads 34 and the male threads 10 are axially contiguous and electrically connected and preferably formed on a single piece of metal termed a "shell."

The insulating support 32 is comprised of insulating material, and serves to support the printed circuit board 22a and the folded-spring center contact 30, supporting them by the female threads on the reverse side of male threads 10. The bottom contact 18 is electrically connected to printed circuit board 22c and is held in place by the insulating support 16.

The three circular printed circuit boards 22 a, b, and c in the male base 14 are coupled together both mechanically and electrically by standoffs and interconnects of which two are shown, 12 and 20. In the assembly of the adapter, the insulating support 32 and the three printed circuit boards are screwed into the male base 14 as a single circuit board assembly.

On the surfaces of the three printed circuit boards, there are a multitude of electronic components soldered or otherwise connected to the printed circuit boards represented by boxes 24 a, b, c, d, and e. The size and exact location of the boxes are representational only. For example, they are not intended to imply that the electronic components are limited to the size of the boxes: an electronic component may extend beyond a box without interfering with electronic components in a neighboring box.

The adapter socket 38 has an open end and a closed end. The adapter base 14 incorporates male threads 10 configured to be inserted into a light bulb socket that has female threads. An internal folded-spring center contact 30 within the adapter socket 38 is configured to make electrical contact with the center contact of a light bulb base when the light bulb base is fully inserted into the adapter socket. An external center bottom contact 18 at the male end of the adapter is configured to make electrical contact with the center contact of a light bulb socket when fully inserted therein.

Adapters usually have an insulating hand-ring at their top by which the adapter is held when screwing or unscrewing it into a light bulb socket. Insulating hand-ring 4 externally surrounds the female socket 38 and, to meet industry standards, extends axially upward beyond the female threads 34 to form an insulating unthreaded collar 36 at the open end of the adapter's female socket 38. At its bottom end, the insulating hand-ring 4 extends axially only partially over the female threads 34, so that a substantial male shoulder area 8 surrounding the female threads 34 is left bare to form the male shoulder 8. In assembling the adapter, the insulating hand-ring 4 is screwed onto male threads created on the outside of female threads 34 down to where it is blocked by the male shoulder 8, and may be attached with glue.

The adapter's female threads 34 and male threads 10 are "synchronized," meaning one is a continuation of the other except for their diameter. Stated differently, they are in phase. Synchronization enables an internal die used in manufacture to be removed by unscrewing. It also allows the circuit board assembly to be screwed into the base as a unit during assembly. These requirements tolerate slight departures from exact synchronization. In this embodiment, there is no gap in the axial dimension between the adapter's female threads 34 and its male threads 10 save for a few thousands of an inch support ring at the seam between the two. It will be appreciated that more of a gap can be accommodated at the expense of reduced shortening. "One-half turn of functional female thread" refers to an axial dimension of one-half the thread pitch, e.g., 1/14 inch for U.S. standard seven threads-per-inch. Sections of threads are considered functional if at least some mating devices engage them.

The adapter is like-to-like, meaning the female threads 34 of the adapter socket 38 and the male threads 10 of the adapter base 14 are the same industry standard type and designation number, for example, U.S. standard medium Edison E26 as shown in FIGS. 1, 2A and 3. The female threads 34 of the adapter socket 38 and the male threads 10 of the adapter base 14 could be configured for other industry standard types including 3-way standard U.S. bulbs. Since the female threads 34 of the adapter socket 38 and the male threads 10 of the adapter base 14 are the same industry standard type and designation number (i.e., Exx), the adapter base 14 could effectively fit and screw into a second identical adapter socket 34.

The Edison screw type defines a system of light bulb connectors, developed by Thomas Edison. The system uses a nomenclature of the form "Exx", which refers to the bulb base and socket diameter and the "xx" is referred to herein as a designation number. For example, "E12" has a diameter of 12 mm. There are four common sizes of screw-in sockets used for line-voltage lamps:

candelabra: E12 North America, E11 in Europe;
intermediate: E17 North America, E14 (SmallES) in Europe;
medium or standard: E26 (MES) in North America, E27 (ES) in Europe;
mogul: E39 North America, E40 (GoliathES) in Europe.

The relationship described herein between the Edison screw type and designation number of the adapter socket 38 and the adapter base 14 means that both would have the same "Exx" (Edison) industry standard screw type and designation number, for example.

Antenna 2 is embedded in the insulating hand-ring 4. The function of antenna 2 is to receive radio frequency (RF) signals from a remote controller or other transmitter. The received signal is enhanced by means of the electronic subsystem represented by box 28 and conductor 29 embedded in the insulating hand-ring 8 which may include amplification, impedance matching, or resonant elements and may be distributed at multiple points around the ring. The signal then travels through flex circuit 26 to printed circuit board 22a. While one location for antenna 2 is in the insulating hand-ring, the use of power wires or bulb parts as an antenna is an option not involving the hand-ring. The same or a separate antenna may also be used to transmit radio frequency signals in order to, for example, participate in a mesh network or to report conditions such as power consumption or temperature. The insulating hand-ring may incorporate other electronic components to provide means for user control, status indicator lights, or light emitting diodes for night lighting.

Electronic components represented by boxes 24 a, b, c, d, and e work together to receive a transmitted control signal, process it, and act on it to control the light bulb as shown in the receiver block diagram described hereinafter in connection with FIG. 9. Reference numeral 6 represents a solder contact to anchor the insulating hand-ring 4 to the shell and to supply the shell voltage to the electronic components 28 located in the insulating hand-ring 4 without sending it up through flex circuit 26 which may create impedance issues at radio frequencies.

The output of the adapter is the voltage and current supplied to the socket's electrical contacts, whether used by a light bulb or another device with a light bulb base. While one embodiment of the adapter incorporates a receiver for a remote controller as discussed above, other electronic configurations and embodiments in the adapter may respond to sensors or user input in addition to or instead of an antenna, and may perform numerous other possible functions such as motion detection, ambient light detection, or sound detection, controlling its output accordingly. The electronics may also provide automatic or delayed turn-off or turn-on of a light or appliance, or broadcast information such as power consumption or bulb failure to monitoring equipment.

A flex circuit is a thin flexible printed-circuit board providing electrical interconnects and insulation for them, plus an optional capability for mounting components onto it. In this application, the flex circuit does not "flex" other than during assembly. A single layer flex circuit is typically 0.008 inch thick. In one embodiment, flex circuit 26 is about 1/8 inch wide and recessed into a shallow groove in male shoulder 8 and provides several electrical interconnects as well as mounting for components within the insulating hand-ring 8. Alternatively, the flex circuit 26 could be much longer and narrower and wrapped helically within a non-functional male (outside) thread and could serve as an antenna. In a simple embodiment, it is a single insulated wire. When the flex circuit is recessed into the male shoulder as shown in FIGS. 1 and 2A, it is located and mounted so as not to be damaged on the outside by friction from the unthreaded collar of the socket into which the adapter is inserted, or on the inside by friction from the male threads of the light bulb base inserted into it.

In one embodiment, the insulating hand-ring 4 extends only over the upper ⅖ of the length of the female threads 34, so ⅗ of the length of the female threads 34 is bare on its exterior except for the embedded flex circuit 26. The female threads 34 have a length in the vertical direction of 0.500 inches, in one example. The length of the insulating hand-ring 4 in the vertical direction in FIG. 1 is 0.440 inches in one example, and extends over the area external to the female threads 34 for 0.200 inches, so that there is a bare region 0.300 inches in length on the exterior of the female threads serving as male shoulder 8. The length in the vertical direction of the male threads 10 is 0.635 inches in one example, and the male center contact 18 is 0.125 inches below the bottom of the male threads in one example. Thereby, the overall length of the adapter is only 1.500 inches in one example, significantly less than heretofore known, and the bulb displacement is about 0.5 inches in one example, also significantly less than heretofore known.

The female threads 34 and the male threads 10 are coaxial, substantially contiguous and electrically connected, and are of the same industry standard screw type and designation number in the adapter. In one embodiment, the insulating hand-ring 4 extends axially only partially over an external surface of the female threads 34 leaving a remaining area (at the male shoulder 8) of the external surface of the female threads 34 uncovered.

In another embodiment, a thin insulating layer may be provided over the male shoulder 8 to cover at least in part an area externally surrounding the female threads 34 of the adapter socket axially proximate to said second end of said insulating hand-ring 4.

In another embodiment the adapter is a simple shortened extender. The folded-spring center contact 30 is electrically connected directly to the male center contact 18, and all other electronic parts are removed including electronic circuitry 24 a, b, c, d, e and 28, connection 29, antenna 2, and flex circuit 26. Printed circuit board 22 b is removed. Printed circuit boards 22 a and c serve as only mechanical supporting parts which are connected by the standoffs, and have means for electrical connection from 30 to 18.

In sum, there is no adapter heretofore known in which the adapter base and the adapter socket are of the same industry standard screw type and designation number, and in which the insulator covering the female part is significantly shortened so that the insulator only partially covers the female part, thereby leaving a substantial part (e.g. ⅗) of the female part bare or covered by only a very thin insulator.

The Reversible Ring

FIGS. 2A and 2B depict the adapter of FIG. 1 in an embodiment having a reversible ring. In order to provide clarity of details, the upper section of the adapter in FIG. 2A is shown magnified in FIG. 2B. The left and right-hand sections are depicted closer to each other, and each is magnified, keeping the dimensions within each section in correct proportion. For simplicity, parts labeled in FIG. 2A that are not in this description of the reversible ring are not labeled in FIG. 2B.

The reversible ring 44 is annular in shape and allows the user to place the adapter in one of two operating modes depending on which side of the ring 44 is facing upwards when the ring is mounted onto the adapter 1. The two adapter operating modes implement compatibility with dimmable light bulbs and compatibility with non-dimmable light bulbs. The electronic components represented by box 28 connected to flex strip 26 detect the position of the reversible ring 44 by means of proximity sensor 50 incorporated at or near the top of the insulated hand-ring and its proximity object 48 on or within the reversible ring.

In one embodiment, the proximity sensor 50 is comprised of two wires 52 and 54 in the insulating hand-ring 4 extending from the electronic components represented by box 28 to contacts raised slightly above the surface of the insulating hand ring to ensure that the electrical contact is reliable. The two wires become electrically connected together by conducting material 48 on one surface of the reversible ring and not the other. The conducting material may be placed in several positions or all the way around so that connection is formed independent of the rotational position of the reversible ring. The wires 52 and 54 become disconnected when the reversible ring is reversed in position. The proximity sensor may alternatively use optical, magnetic, or capacitive means, or a mechanical switch which are activated by the reversible ring in one of its reversible positions. The corresponding proximity objects in the reversible ring would be optical markings, magnetic material, capacitor plates, or mechanical indents, respectively. The proximity sensor 50, and the variations described herein, serves as a means for detecting and responding to a mounting orientation of the reversible ring 44.

The reversible ring 44 is held in place by two to four connecting snaps 42. To reverse its position, the user snaps off the ring, turns it over, and snaps it back on. This does not require use of a tool. When the ring is off, the user has access to the top of the insulating hand-ring which could include, for example, a reset button or other mechanism which resets the electronics (not shown for simplicity). It will be appreciated that the same functions could be achieved by a reversible cylindrical ring covering part or the entire outside of the hand-ring, instead of an annular ring covering its top, or by a ring that is part annular and part cylindrical. The reversible ring may have a visual indication of which orientation it is in. The visual indication may be a color code 46 and/or other marking visible from a distance as well as printing visible nearby. The printing might say, for example, "dimmable bulb only" on one side, and "non-dimmable bulb" on the other to visually indicate the side to be oriented upwards for a first mounting orientation of the ring and for the side to be oriented upwards for a second mounting orientation of the ring.

Again, when the reversible ring 44 is mounted in a first orientation, the electronic components of the adapter 1 are configured to operate a non-dimmable light bulb and when mounted in a second orientation, the electronic components of the adapter 1 are configured to operate a dimmable light bulb.

An adapter employing the reversible ring feature comprises a reversible ring having two sides visually distinguishable from each other. Means are provided for affixing the reversible ring to an open end of the aforementioned insulating hand-ring to allow the reversible ring to be removed from, inverted, and re-affixed to the open insulating hand-ring. Electronic control circuitry is provided to control the electrical output of the adapter. Electronic detection circuitry is electrically connected to the electronic control circuitry and comprises means for detecting and responding to an orientation of said reversible ring. The electronic control circuitry is user configurable to operate in one of two operating modes based on the orientation in which the reversible ring is mounted on the open end of the insulating hand-ring.

The Adapter in Use

FIG. 3 depicts the adapter of FIG. 2A in use, i.e., screwed into a socket with a light bulb screwed into it. Elements of the adapter depicted in FIG. 2A but not referred to here are not labeled for simplicity. Light bulb base 60 is shown almost fully inserted into the female socket of adapter 68, and the adapter 68 is shown fully inserted into the female light bulb socket 64. Light bulb center contact 67 is shown just short of fully compressing the folded spring to illustrate the shape of the spring before it is completely squashed into the printed circuit board. Most light bulb bases, including the one shown, will fully compress the spring. However some light bulb bases have so blunt a nose that they will not fully compress the spring. The bare male shoulder 8 fits into the insulating unthreaded collar 62 at the mouth of the light bulb socket 64. This significantly shortens the displacement of the bottom electrical contact 67 of the light bulb base 60 from the bottom electrical contact 66 of the light bulb socket 64.

In this example, the unthreaded collar 62 at the mouth of the light bulb socket 64 fully covers approximately one-and-a-half turns of functional female threading in the adapter's socket. Thus, approximately one-half turn at the bottom of the adapter's female threading does not engage the particular light bulb shown due to the bulb's pointed nose. However, that one-half turn is still functional threading because there are other light bulb bases that will engage it.

As explained above, in one embodiment, the insulating hand-ring 4 extends axially only partially over an external surface of the female threads 34 leaving a remaining area of the external surface of the female threads 34 uncovered. The female threads 34 and the male threads 10 are coaxial, substantially contiguous and electrically connected, and have the same industry standard screw type and designation number in the adapter. As a result, when the adapter base is fully inserted into a light bulb socket, the uncovered external surface (at shoulder 8) of the female threads 34 is configured to fit into an insulated unthreaded collar at a mouth of a light bulb socket thereby shortening a displacement of the center contact of the light bulb base when fully inserted into the adapter socket from the center contact of the light bulb socket.

In another embodiment, the female threads 34 and said male threads 10 are coaxial, substantially contiguous and electrically connected, and have the same industry standard screw type and designation number such that when said adapter base is fully inserted in the light bulb socket, and the area (male shoulder 8) externally surrounding said female threads covered at least in part by the thin insulating layer fits into an insulating unthreaded collar at a mouth of a light bulb socket thereby shortening a displacement of the center contact of a light bulb base when fully inserted into the adapter socket from the center contact of the light bulb socket.

In still another variation, the adapter socket 38 and the adapter base 14 are coaxial and partially overlapping and have the same industry standard screw type and designation number, as explained above. At least one-half turn of a functional female thread of the adapter socket overlaps the (male shoulder 8) region of the adapter base and is configured to fall fully within an unthreaded collar at a mouth of the light bulb socket when the adapter base is fully inserted therein, thereby shortening a displacement of the light bulb base from the light bulb socket.

Bulb Lock/Release Mechanism

It may be desirable to market the shortened adapter bundled with and already attached to a dimmable compact fluorescent light (CFL) or dimmable light emitting diode (LED) bulb for several reasons. One reason is that a major use of the adapter is with such light bulbs. Another reason is to ensure that the user selects a bulb of a suitable type and quality.

When the two products are so bundled, it may be desirable to have a mechanism that reversibly locks the adapter to the light bulb such that it can be removed if desired. For example, if the original light bulb fails, the adapter could then be locked onto a new light bulb. It would additionally be desirable to have a finger-activated mechanism that allows the adapter to be easily locked onto or unlocked from the light bulb.

Another use for locking the adapter to the bulb is for hard-to-reach recessed sockets where it would be difficult to retrieve the adapter if it stayed behind in the socket. For deeply recessed sockets, it may be further desirable to eliminate the adapter's insulating hand-ring to enable the adapter to fit into a socket. In that case it would be difficult, and unsafe, to extract the adapter from the deep socket if it remained behind in the socket.

Figure 4A:
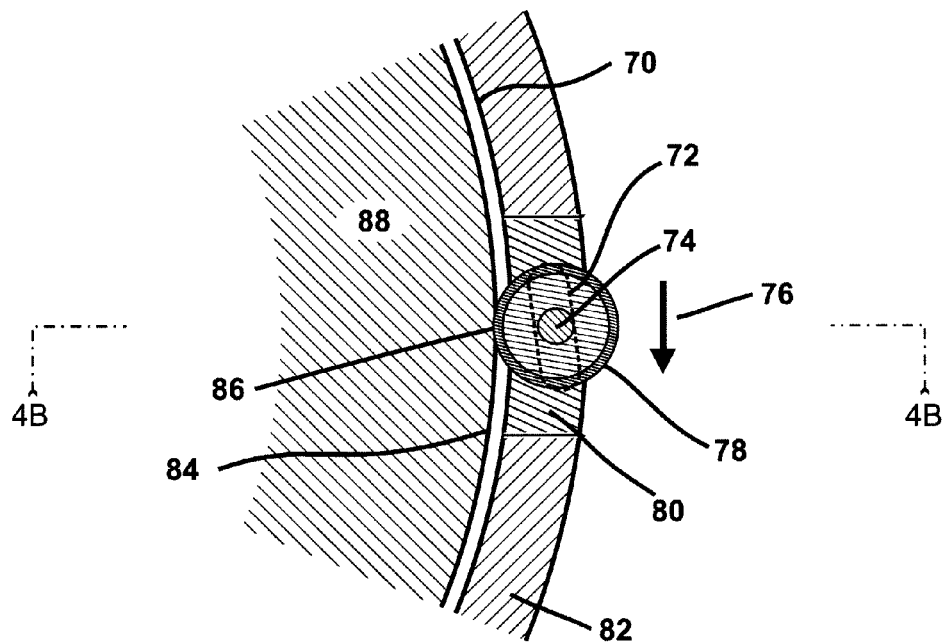
FIGS. 4A and 4B are partial cross-sectional views showing a mechanism to reversibly lock the adapter onto a light bulb.
Figure 4B:
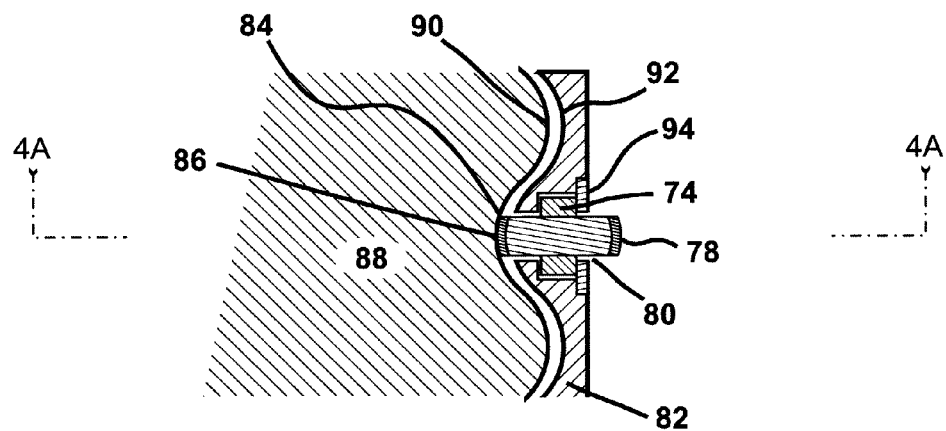

FIGS. 4A and 4B depict one embodiment of such a bulb lock and release, depicted about ten times actual size, in one example. The insulating hand-ring 8 in FIG. 1 is eliminated in FIGS. 4A and 4B. The antenna 2 in the insulating hand-ring may be replaced either by a wire wound around and embedded in the male shoulder 8, or by the use of power wiring or bulb parts.

Note the female threads 34 on the right side of FIG. 1, and in particular, note the uppermost female thread projecting inwards (to the left). FIG. 4A depicts a section of the adapter's metal shell 82 that incorporates this particular thread, shown by means of a slightly tilted cross sectional view (conforming to the tilt of the threads) through this section.

FIG. 4A further depicts a male thread valley 84 of a light bulb base 88 that has been inserted into the female socket 38 of FIG. 1, and depicts the peak of the female thread 70. A finger release roller 78 has a rubber surface, and rotates around the roller axle 74. In turn, the roller axle can move up and down in the raceway 72 which is formed in a slot 80 in the adapter shell 82. The rubber surface of the roller makes contact with the light bulb's male thread valley at the point of engagement 86.

FIG. 4B depicts further details in a (slightly tilted) vertical cross-section through the mid-point of the axle 74 of the lock/release mechanism, with the finger release roller 78 now shown as penetrating the female thread peak 70 shown in FIG. 4A. In correspondence with FIG. 4A, FIG. 4B depicts the female threads 92 on the adapter shell 82 mating with the male threads 90 on the light bulb base 88, and the finger release roller rotating on the roller axle 74. The finger release roller meets the male thread valley 84 at the point of engagement 86. The thickness and cross section of the finger release roller conform to the shape of the male threads valley 84 of the male threads 90 of the light bulb base 88. The roller rotates on axle 74 in raceway 72 (in FIG. 4A), the left side of which is formed in the shell 82, and the right side of which is formed by a retaining part 94 which holds the axle in place after insertion of the assembly into the adapter shell 82.

As the bulb is screwed in (clockwise here), the male threads on the light bulb base 88 rub against the rubber surface of the finger release roller 78 at the engagement point 86. This continually rotates the roller and pushes the axle of the roller downwards in the raceway 72, in the unlock direction. The radial gap between mating male and female threads in E26 U.S. standards is 0.004 inches±0.0025 inches.

When one tries to unscrew the bulb (counter-clockwise here), the bulb turns the finger release roller 78 clockwise so that the axis of the roller moves further in the upwards direction in the raceway 72, thereby forcefully pressing the finger release roller into the valley of the mating male thread and jamming the bulb against further unscrewing.

To unscrew the light bulb, the finger release roller 78 is rotated clockwise in the finger release position by a finger and held in this position, causing axle 74 of the roller to move downward in the direction 76 in the raceway 72 so that the finger release roller projects at most only slightly to the left.

The adapter's metal shell 82 incorporating the female thread peak 70 is approximately 0.047 inches thick at its thickest point. Similar schemes can be implemented at much larger thicknesses, for instance having the finger release roller 74 used with, and protruding through, the insulating hand-ring 4 of FIG. 1. For such larger thicknesses, the finger release roller 78 has a correspondingly larger diameter. The diameter of the finger release roller shown in FIGS. 4A and B is 0.080 inches based on U.S. standard E26 threading. Only one finger release mechanism is shown, but a second one may be incorporated on the opposite side of the adapter shell 82 so that they can be grasped between thumb and forefinger.

Miniature Remote Controller

Figure 5:
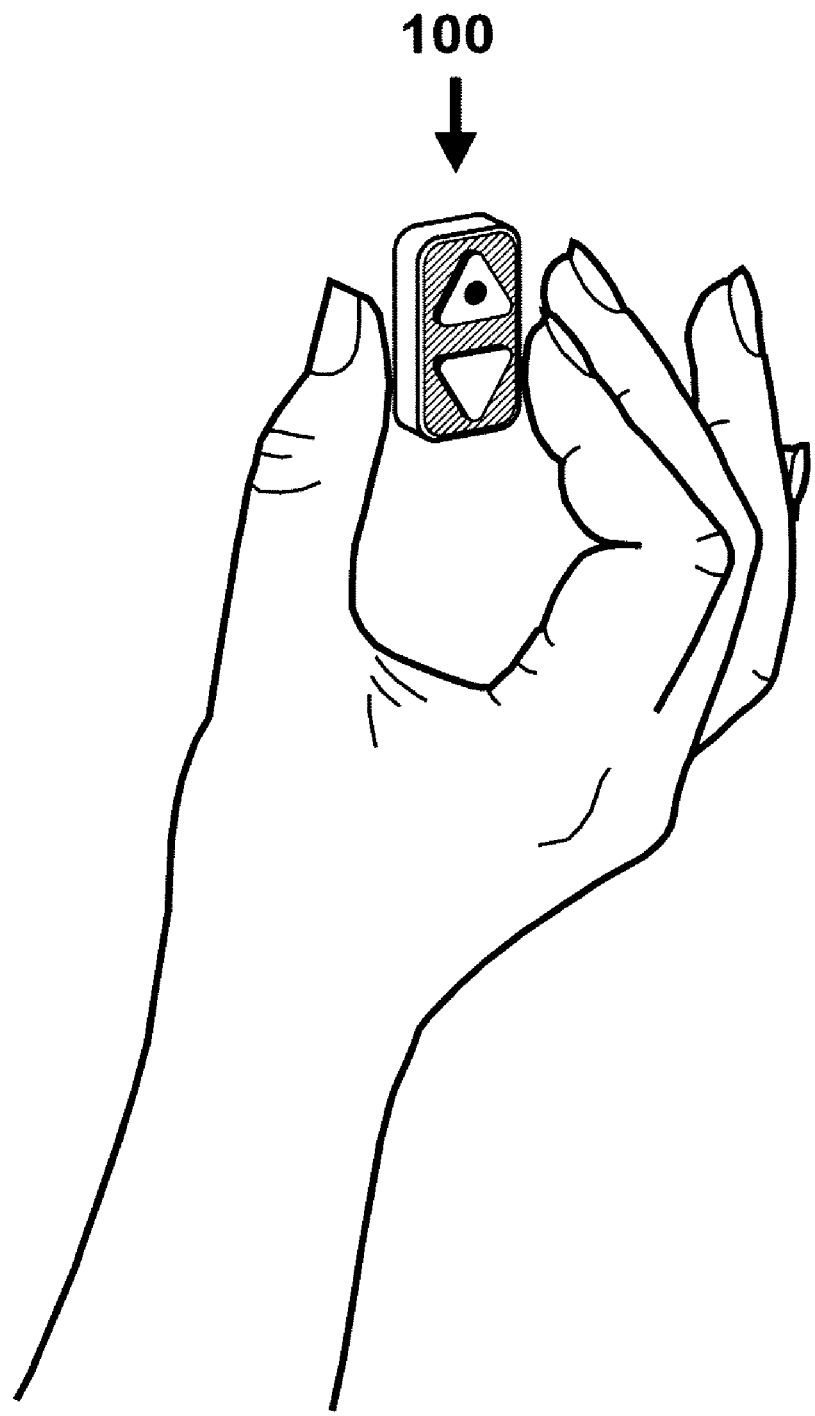
FIG. 5 shows a perspective view of a miniature remote controller held between two fingers of a hand, for purposes of illustrating its relatively miniature size.

FIG. 5 depicts a user's hand holding a miniature remote controller 100 according to embodiments described herein. The diagram of FIG. 5 includes a user's hand to indicate its shape and very small size. It is so small and compact that it would be awkward to use in one's hand. By design it discourages hand-held use, and further discourages frequently moving it from one place to another where it could be easily misplaced. Thus, it is very much unlike a handheld remote controller, where a single unit is intended to be moved among multiple points of use. Another purpose of this design is to have it sufficiently small that it is visually and physically unobtrusive when mounted on a larger object. Alternatively, it may be completely hidden, e.g. on the underside of a table or chair or other object.

In addition to its small size, its light weight makes it easy to mount on larger objects wherever control is desired. Such a larger object can be fixed, such as a wall or railing, or a piece of furniture where it can be mounted in an unobtrusive location, e.g. under the edge of a table or under the arm of a chair. Such a larger object can be movable, such as a clipboard, television remote controller, or crutches. Thus, unlike a stick-on wireless wall switch, the controller is intended and configured for unobtrusive or concealed locations, or locations where it does not interfere with the use of an object such as clipboard, television remote controller, or crutches. Also, clutter on a table can be reduced by mounting the miniature remote controller beneath the edge of a table. Further, some people consider larger controllers to be unsightly and prefer them to be concealed, which is facilitated by the miniature remote controller 100.

If desired, the controller can be repositioned, such as to a different piece of furniture or another place on the same piece of furniture. The miniature remote controller may be removably mounted to the larger object by various means such as double-sided adhesive pads, magnets, suction cups, a tiny screw, adhesive Velcro© tape, snap fasteners with one part of the snap fastener attached to the miniature remote controller and the other part removably attached to the larger object, or adhesive putty. In one embodiment, 3M brand Command® adhesive strips are used. This product is a single-use pressure-sensitive adhesive pad incorporating a special tab mechanism for easy removal without damage or residue to the surface. This product may be used in combination with other attachment means such as Velcro© tape or magnets, and may incorporate a part between the miniature remote controller and the larger object.

The miniature remote controller 100 transmits a radio frequency signal to control a device, but could, in another embodiment, emit an optical signal. In one embodiment, the miniature remote controller 100 controls a light bulb by means of the adapter of FIG. 1 or FIG. 2A wherein the antenna 2 receives the signal. However, receivers for the miniature remote controller's signal are not limited to adapter devices, such as the one described herein.

Figure 6:
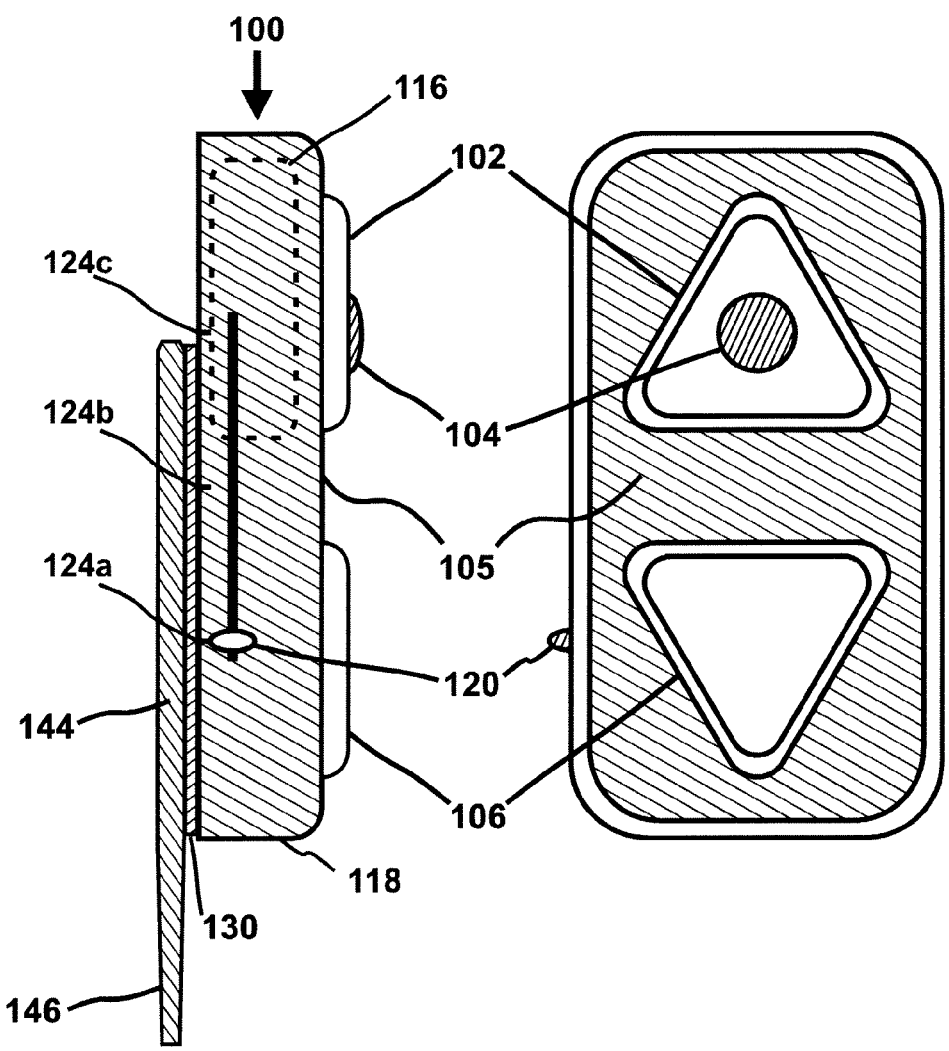
FIG. 6 shows additional views of the miniature remote controller.

FIG. 6 depicts the miniature remote controller according to one embodiment. It comprises a housing or body 118. The top surface 105 of the body comprises a top button 104 and a bottom button 106 disposed thereon. The top button has a dimple or a bump or other distinctive feature such as a color to distinguish it both visually and by touch from the bottom button. FIG. 6 shows an example where buttons 102 and 106 have a triangular shape, and where the top button is a right-side up triangle and the bottom button is an inverted triangle indicating "up" (brighter) and "down" (dimmer) respectively. This is meant by way of example, and not to be limiting. However, the triangular button shape, the opposite arrangement of just two buttons, and the marking on one button make the controller very user-friendly, are in deliberate contrast with conventional remote controllers having many buttons and even a display. A miniature rocker switch may also be used instead of two buttons.

The housing or body 118 and consequently the top surface 105 are sized to support a minimal amount of buttons, for example, at least one button, but no more than two buttons, e.g., buttons 102 and 106. Furthermore, the buttons 102 and 106 are sized to be actuated by a user's finger tip of average size, and no larger. The shape of the housing body 108 is shown in the figures to be rectangular, but that is only an example. It could have an oval shape, circular shape, etc. While the housing 118 can be held in a user's hand, its size and shape is configured so that it is not used when held in a user's hand, but rather only for use when it is mounted to a larger object. The buttons 102 and 106 are one example of finger actuation means. Thus, the miniature remote controller 100 is configured to be a mountable remote controller, not for hand-held use, and of such a small size that when it is mounted on a larger object, it is not visually distracting or obvious.

FIG. 6 depicts one embodiment of a miniature remote controller 100 configured to act as three independent remote controllers which could, for example, control three adapters, such as those described herein. The controller 100 incorporates a battery 116 within its housing 118 to provide power for processing and transmission of signals. In one embodiment, battery 116 is absent and power is derived from the force of the user's finger on a button or other finger-actuated component.

As described herein, users may want to have more than one miniature remote controller mounted at a given location. They will be sold in assorted colors for this purpose. However, if too many miniature remotes are mounted together, their small size becomes defeated. For this situation, a three-position selector switch 120 may be incorporated on the side of the miniature remote controller 100 that can slide among multiple switch positions shown by tic marks at reference numerals 124 a, b, and c. In this example, there are three switch positions for the selector position, but this is only an example. There may be two or more than three switch positions for the selector switch.

The selector switch operates as follows. Each transmission from the miniature remote controller includes the command desired, an Identification Number for the particular controller, and redundancy for error amelioration. There are hundreds of millions of possible Identification Numbers. When selector switch 120 is moved to another position, it changes the Identification Number of the controller thereby becoming, in effect, a different controller. Accordingly, one miniature remote controller then functions as three different controllers without an increase in size. The three controllers thus simulated are completely independent, meaning each can be linked or unlinked to any controlled appliance (e.g., light or fan) without affecting the linkages of the other two simulated controllers.

Figure 7:
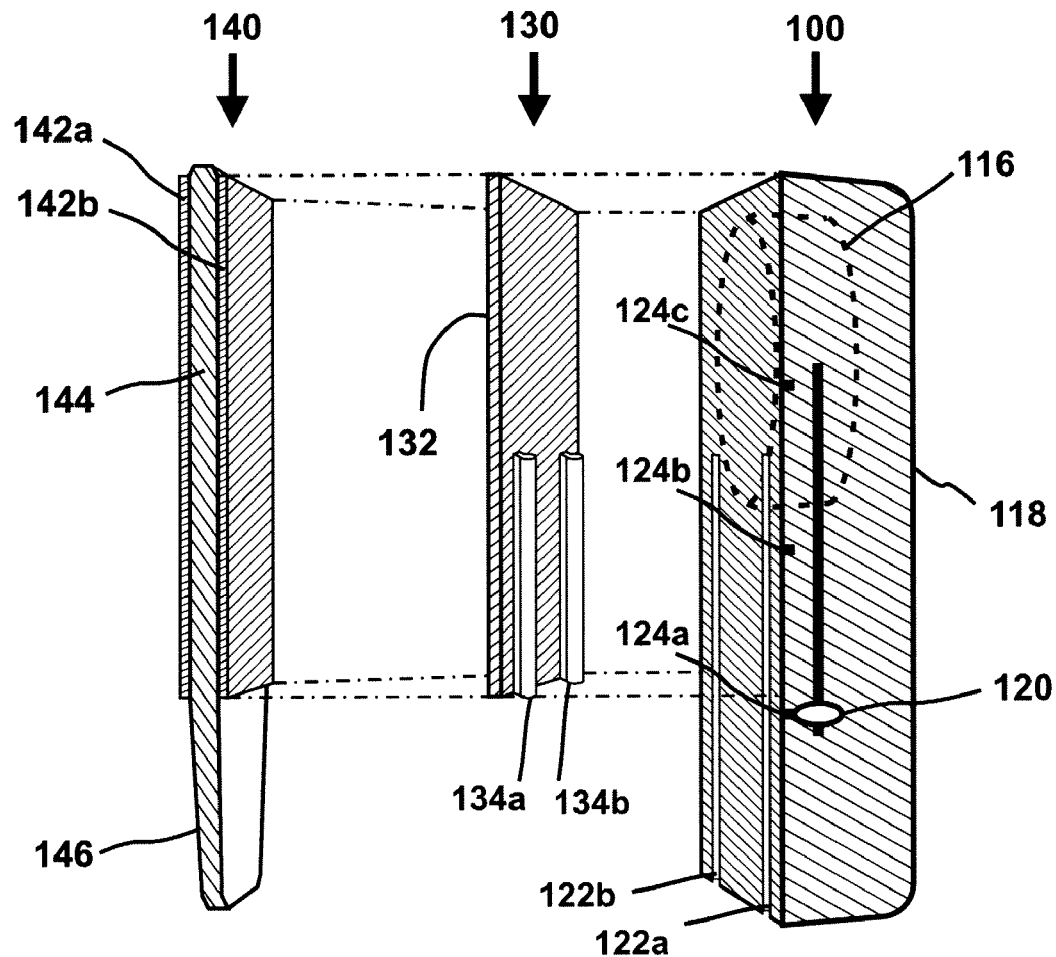
FIG. 7 is an exploded view of the miniature remote controller and its mounting components.

FIG. 7 is an exploded view of a mechanism for removably attaching the miniature remote controller 100 of FIG. 6 to a selected surface. Adhesive assembly 140 incorporates a readily removable adhesive strip 144 such as the 3M brand Command® having a backing paper 142 *a* which is removed before applying the left side of adhesive strip 144 to an object. 3M brand Command® adhesive incorporates an extended tab 146 for removal from the object after it is applied.

The miniature remote controller incorporates a plastic slider mechanism 130 with a roughened rear surface 132 to which is attached the right side of adhesive strip 144 after removal of backing paper 142 *b*. Plastic slider mechanism 130 is attached to the body 118 of the miniature remote controller by projecting ribs 134 *a* and *b* which slide in slots 122 *a* and *b* on the back of the miniature remote controller body 118 in FIG. 7, thereby allowing the user to slide the miniature remote controller up and down on the rib structure. In one embodiment, the controller body 118 can be completely removed from the plastic slider with extra force; in another embodiment it cannot. Removing it provides extra convenience but may cause pieces to be lost.

After installation, the user slides the miniature remote controller 100 downward on the rib structure so as to hide the Command® adhesive tab 146. To remove the miniature remote controller 100 from the object on which it was mounted or attached, the user slides the controller 100 upward to expose the tab 146, grabs the tab 146 firmly and pulls it downward, stretching it and cleanly removing the adhesive from both the controller and the object.

In one embodiment, the same plastic slider mechanism 130 allows the miniature remote controller body to be temporarily removed from its mounting position with extra force, leaving the plastic slider mechanism behind still glued in place. This is useful for a new linking or unlinking and various other purposes. Physically this is accomplished by a slight increase in the size of the ribs at their top and a slight decrease in the size of the slots at their bottom, not unlike the mechanism used to make the cap of a plastic pen "click" onto it. The plastic slider concept also allows for alternate plastic sliders of different shapes, for instance a plastic slider curved on the outside for mounting on tubular objects such as round chair-arms, rails, crutches, etc.

Linking and Unlinking

A remote controller is said to be linked to a receiver if the receiver will accept commands from that remote controller. A remote controller is said to be unlinked to a receiver if it is not linked to it. Linking is the operation of becoming linked and unlinking is the operation of becoming unlinked.

The receiver needs to know whether it is to respond or not respond to the signal from a given miniature remote controller, i.e., whether it is linked or unlinked to that particular controller. Several systems are in common use for linking and unlinking of remote controllers and their receivers. Most take the form of entering special codes and/or pressing a "learn" button or using a special tool on one or both units. For maximum flexibility, the remote controller herein incorporates means for easily linking and unlinking to a given receiver at the sole discretion of the user, and links and unlinks in a more intuitive and user-friendly manner than any of these existing systems. The user holds the miniature remote controller in close physical proximity to the light or fan or similar appliance and presses both buttons 102 and 106 at the same time for two seconds. The receiver detects this action and the higher signal strength and authorizes the linkage. This same procedure is used for linking or unlinking. This linking and unlinking process is described in more detail hereinafter in connection with FIG. 10.

Linking does not preclude a receiver from being linked to other remote controllers, nor does it preclude a remote controller from being linked to other receivers. In other words, a given miniature remote controller may be linked or unlinked from a given receiver without affecting the relationship(s) between that remote controller and other receivers or the relationship(s) between that receiver and other remote controllers. Arbitrary combinations are possible without interference with one another.

Figure 8:
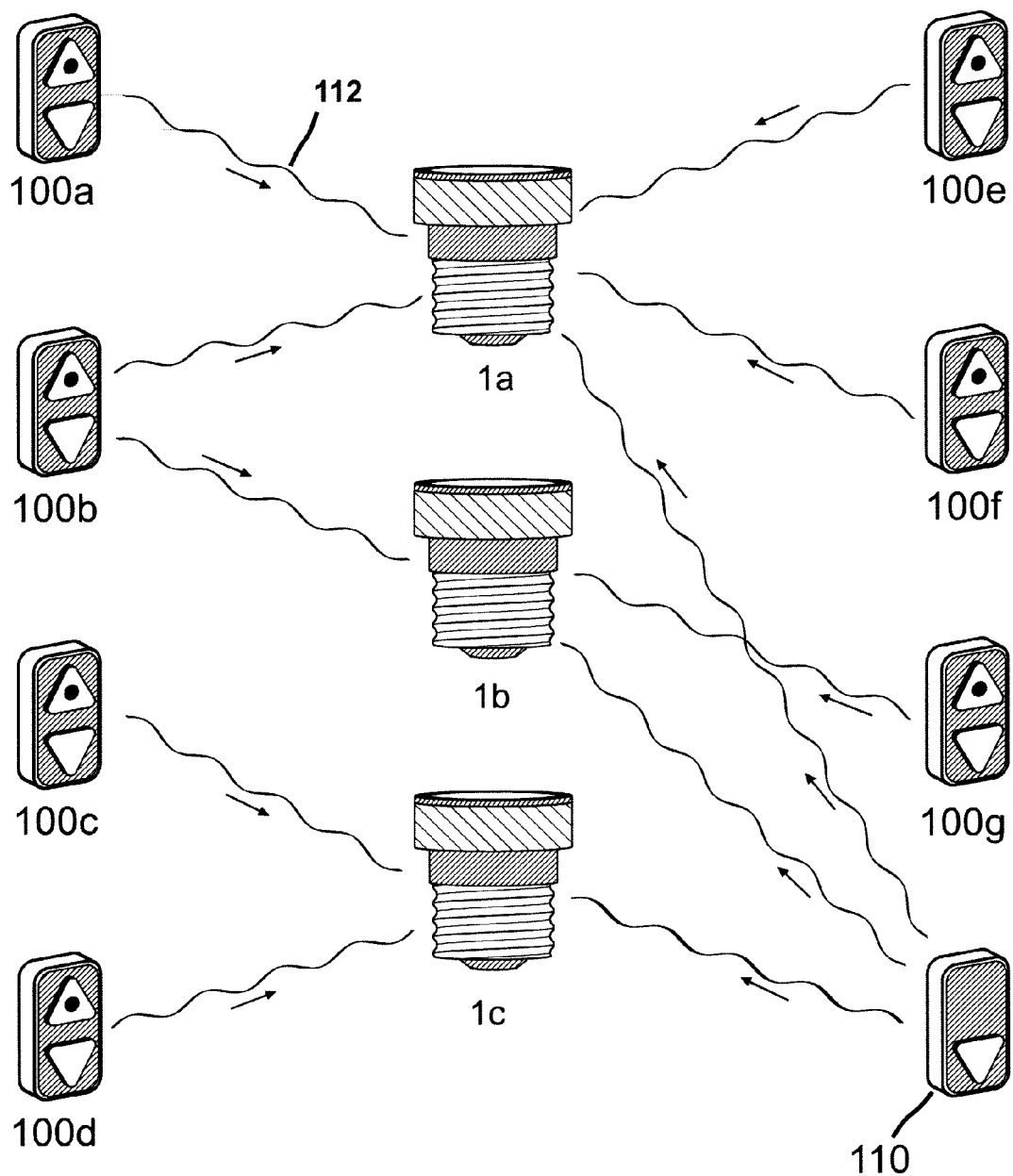
FIG. 8 shows an arbitrary combination of miniature remote controllers and adapters.

FIG. 8 depicts one such arbitrary combination, wherein 100*a* through 100*g* are seven miniature remote controllers, and 110 is an eighth miniature remote controller with only an off button. 1*a*, *b*, and *c* are three adapters, and 112 is a radio frequency wave moving in the direction indicated by the arrow beneath it, thereby providing a link to the designated adapter.

In FIG. 8, the following combinations are shown: (a) five miniature remote controllers 100*a*, *b*, *e*, *f* and 110 control one adapter 1*a*, (b) two adapters 1*a* and 1*b* are controlled by one controller 100*b*, and (c) one controller 110 can turn off all three adapters 1*a*, *b*, and *c*. All of the controllers and all of the adapters can be in a single room and operate without interference among each other. Accordingly, a person can sit in one chair in a room where miniature remote controllers are placed and control a single light or a set of several different lights, and move to another chair in the same room or a nearby room where controllers are placed and control the same lights, other lights, or the same plus other lights.

Receiver Circuitry and Operation

Figure 9:
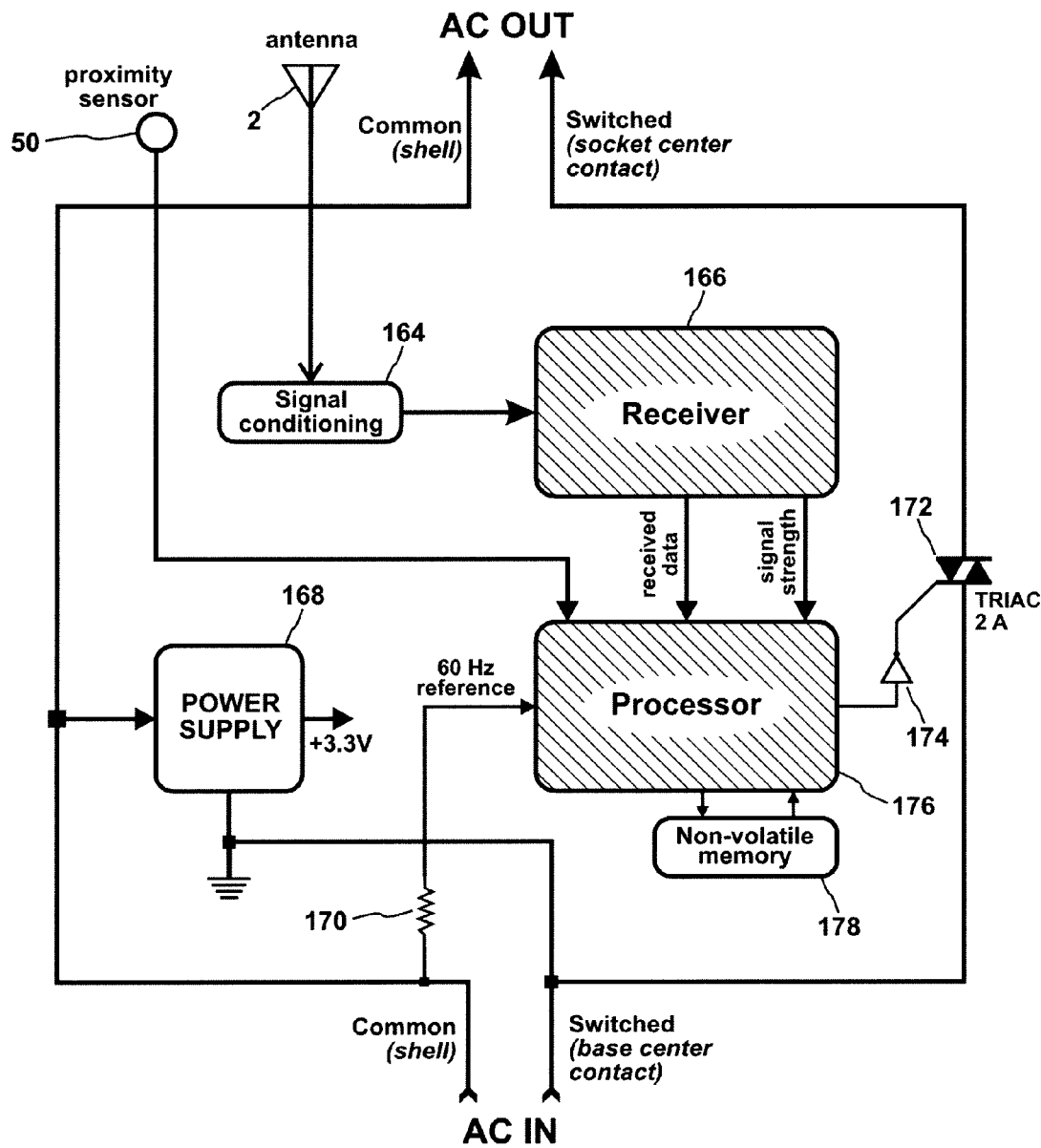
FIG. 9 is a block diagram of the receiver electronic circuitry that may reside in the adapter or other device.

FIG. 9 is a block diagram of receiver circuitry such as might be incorporated within the adapter shown in FIG. 2A. "Receiver" may refer to the chip or other circuit 166 directly detecting the radio frequency signal, that chip plus supporting components, or to the entire adapter 1 depending on context. POWER SUPPLY 168 converts the incoming 120 VAC power (from the appliance socket, e.g., lamp socket) to low-voltage DC, in this case 3.3 volts, for powering chips and other components of the receiver. The 120 VAC input power is also passed through to the AC output (chopped when dimming) by the TRIAC 172 which is shown wired in the manner used ubiquitously for dimming light bulbs. Two ampere TRIAC 172 will easily power a 150 watt light bulb.

The incoming radio signal is received by antenna 2, such as antenna 2 in the adapter of FIG. 2A or other means. The signal from antenna 2 is conditioned before being coupled into receiver 166 for amplification and detection. Signal conditioning 164 may comprise impedance matching among the various RF components, SAW (Surface Acoustic Wave) filtering to suppress out-of-band signals, and, optionally, preamplification near the antenna.

Receiver 166 typically incorporates an integrated circuit chip designed for the frequency band selected. For example, rfRXD0420 is an integrated circuit receiver chip from MicroChip® for use at 433.92 MHz. The receiver chip provides Low Noise Amplification (LNA) heterodyning, mixing, Automatic Gain Control (AGC) and other functions. The receiver chip is supported by external components not shown, most importantly a quartz crystal to set the frequency and an Intermediate Frequency (IF) filter to reject nearby signals. The output of the Receiver is an asynchronous binary data stream indicating, in the simplest Amplitude Modulation (AM) mode, presence or absence of the RF signal by a one or zero respectively. From this binary data, processor 176 extracts commands from remote control transmitter devices, such as the miniature remote control of FIG. 6, interprets them, and executes them. Of particular importance (for linking and unlinking) receiver 166 also puts out a slowly-varying analog voltage equal to (approximately) the logarithm of the RF signal strength which it derives from its Automatic Gain Control (AGC) activity.

Processor 176 typically is a self-contained integrated circuit microprocessor, such as a PIC12F683 processor chip from MicroChip, for example. Software preloaded into the chip (firmware) configures the receiver circuitry and controls all its operations. A small non-volatile memory (NVM) 178 holds data across a power failure. (In the PIC12F683 integrated circuit chip the NVM 178 is included in the processor.)

The output of processor 176 is a binary signal that fires TRIAC 172 through an isolation transistor, indicated schematically as amplifier 174. After firing, TRIAC 172 remains conducting until the next zero-crossing of the AC current. Processor 176 includes timers which the software uses to accurately set the firing times of TRIAC 172 according to the brightness of the light desired. If the light is to be full OFF, TRIAC 172 never fires. If the light is to be full ON, TRIAC 172 is driven to fire continuously or nearly so.

One of the inputs to the processor is the output from the proximity sensor 50 indicating the orientation of the reversible ring. If the reversible ring is set for non-dimmable light bulbs, the software constrains TRIAC 172 to be either full OFF or full ON at all times. Another input to processor 176 is the AC input voltage itself, buffered by a very large resistor 170 and treated as a binary signal. This signal is required by the software to control TRIAC 172 and fire it in a precise timing relationship with the AC voltage. Noise on the AC power line is suppressed by the software. The 60 Hz input is also used to time the "Flash" function so that multiple lights flashing stay perfectly synchronized, even when they are on different circuits.

In one version of the software, NVM 178 is used for two purposes. First, it contains the list of the Identification Numbers of remote controllers linked to this receiver and hence authorized to control it. The PIC12F683 integrated circuit chip allows up to 63 remote controllers with 28-bit ID numbers to be linked to the receiver at one time. The other use of NVM 178 is to store the current light level. This unique feature of the receiver circuitry disclosed herein allows lights to return to their previous brightness after a power failure. The user does not need to reset the adapter's circuitry after a momentary power interruption or if a particular socket is accidentally turned off. A new receiver powers up with the light full ON.

Figure 10:
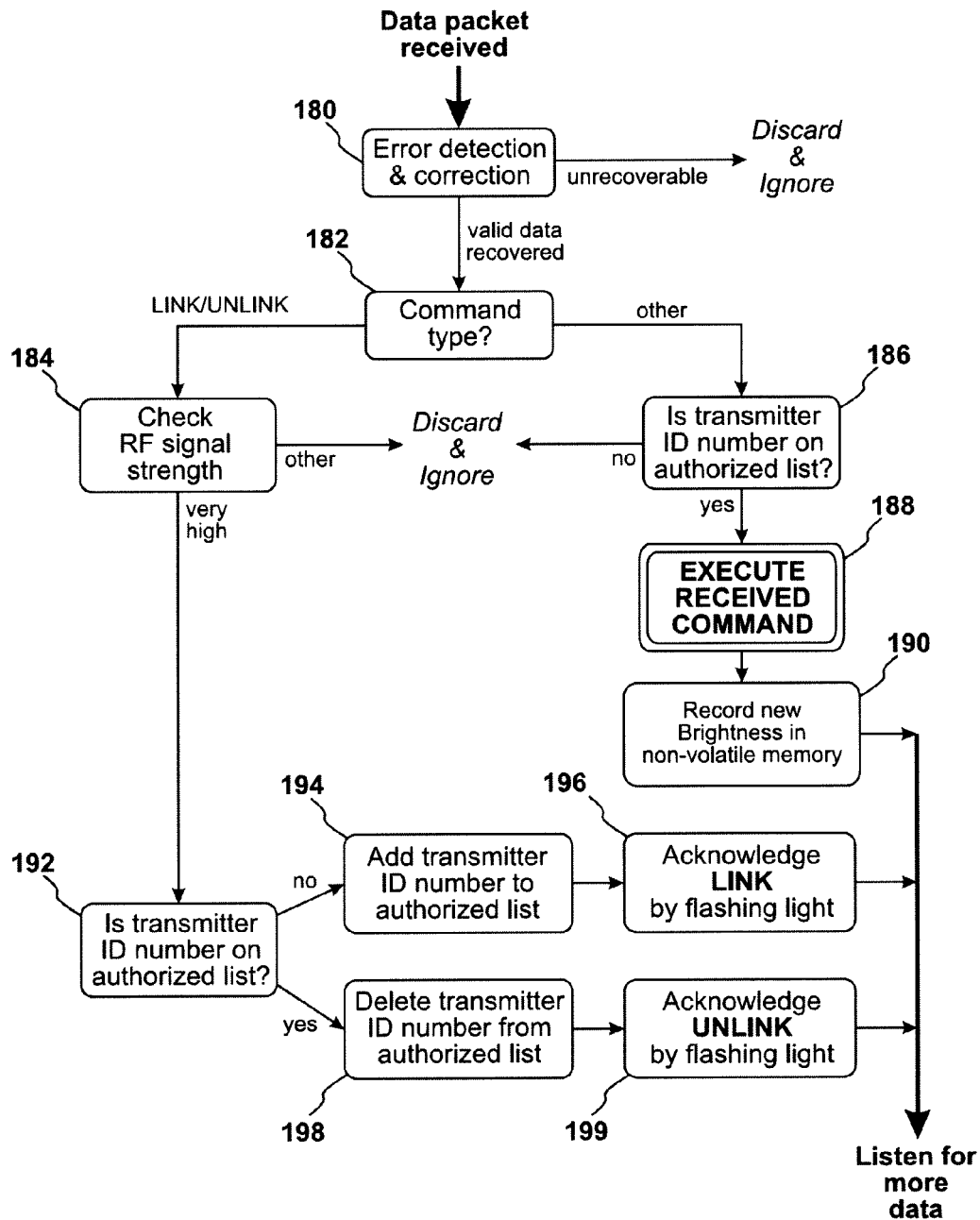
FIG. 10 is a flow chart for the operations of the receiver when linking and unlinking to a miniature remote controller.

FIG. 10 is a flow chart of the receiver software operations with emphasis on linking and unlinking. A stream of binary data is output by radio receiver 166 to processor 176. It is the job of this software executed by processor 176 to interpret and act on it.

When no signal is present there is still a data stream. The AGC in radio receiver 166 "opens up" and converts RF noise into zeros and ones. That noise may be random or from man-made sources.

A compatible transmitter, such as the miniature remote controller of FIGS. 5, 6, and 7, transmits its data packets including various redundant information. Specifically, a data packet comprises:
 (a) an unchanging header
 (b) the transmitter's Identification Number (28-bits)
 (c) a command code
 (d) byte parity bits and a checksum.

All the above is transmitted a second time with a deliberately unpredictable gap between the two.

Transmission of each packet requires about 0.1 second, for example. If the software 180 recognizes valid data but cannot recover it without error, the data is ignored and discarded and the system begins listening again. If identical data is received error-free twice in a row closely spaced, the second packet is ignored. Error correcting coding allows certain types of bit errors to be corrected and the data rendered usable.

Once valid data is in hand, software 182 examines the imbedded command code representing the user's intentions.

If the received command is other than Link/Unlink, receiver software 186 immediately checks whether the transmitter's Identification Number matches any in its authorized (linked) list located in the receiver's non-volatile memory. If the transmitter is unauthorized (not linked) its command is discarded, has no effect whatsoever, and that transmitter remains unlinked.

If, on the other hand, the transmitter is authorized its command is executed 188. When that execution results in a new level (brightness), including OFF, for the controlled light, which it normally does, that new light level is recorded 190 in non-volatile memory 178 for restoration should a power interruption occur.

If the received command is Link/Unlink a different chain of events occurs. Link and Unlink use the same transmitted code because the one-way communication leaves the transmitter no way of knowing whether it is already linked to a given receiver. For Link/Unlink, and only for that command, the received signal strength is interrogated 184. Only if signal strength is very high, indicating the transmitter is very near, does the software proceed.

If the signal strength is very high, the transmitter's Identification Number is checked 192 against the authorized list. If it is absent, it is added 194 (Linking) and if it is present, it is deleted 198 (Unlinking). If the list is full (63 authorized transmitters), preventing a Linking, the software deletes the oldest ID and proceeds with the Linking.

If a light bulb is present, successful Linking or Unlinking is acknowledged to the user by flashing the light twice. The flash pattern is different for Link 196 and Unlink 199 so that experienced users will recognize which has occurred. For example, Link is dot-dash and Unlink is dash-dot.

Figure 11:
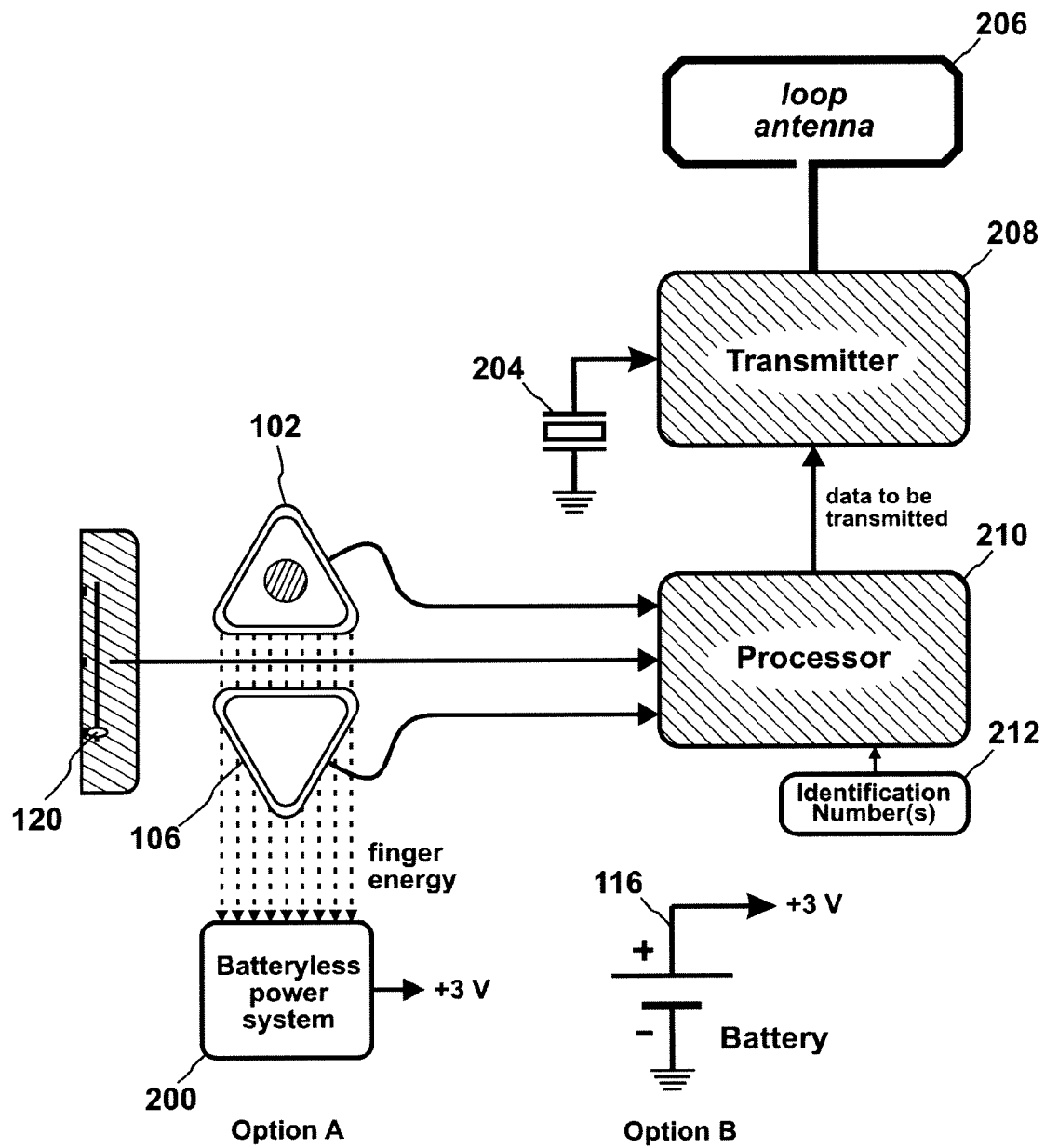
FIG. 11 is a block diagram of the transmitter circuitry in the miniature remote controller.

FIG. 11 is a block diagram of transmitter circuitry such as might be incorporated within the miniature remote controller 100 shown in FIGS. 5-7. "Transmitter" may refer to the chip or other circuit 208 directly generating the radio frequency signal, that chip plus supporting components, or to the entire miniature remote controller 100 depending on context.

In one embodiment, power is supplied to the controller by battery 116 which may, for example, be a 3-volt lithium-ion button battery. In another embodiment, batteryless power system 200 harvests power from the user's button-pressing action. Piezoelectric or magneto transducers may be used. The batteryless embodiment uses specially designed power conservation circuitry throughout the controller. Each miniature remote controller has a preassigned Identification (ID) Number 212 embedded within it at manufacture. If a selector switch 120 is used, multiple Identification Numbers 212 are required as described in connection with FIG. 6. A simple way to embed the ID Number 212 is to include it in the firmware permanently installed with each processor 210. Read-Only memory, ROM, and other techniques are also available.

To conserve power, processor 210 and transmitter 208 are designed so that they have a "sleep" state drawing negligible power when not in use or battery 116 will be quickly drained. The rfPIC12F675 is an integrated circuit chip from Micro-Chip® for use at 433.92 MHz combining the functions of processor 210 and transmitter 205. This chip can be asleep for many years without depleting even a small battery 116. An alternative circuit requiring additional components (not shown) eliminates all sleep current by disconnecting the rfPIC12F675 completely from battery 116 unless button 102 or 106 is pressed.

Software preloaded into the processor 210 (firmware) configures the transmitter circuitry and controls all its operations. The inputs to processor 210 are wires from up button 102, down button 106, and selector switch 120 if present. Ground connections (not shown) on the other terminal of button 102, 106 or selector 120 complete the circuit. Software in processor 210 monitors and times all button activity to infer the user's intentions. The software then generates the exact bit pattern to be transmitted and passes it to transmitter 208. Software also detects a stuck button, shutting down until it is released to conserve power.

The output of processor 210 is a binary signal turning on and off transmitter 208 and, optionally, a second signal shifting its frequency between one of two nearby values (Frequency-shift keying or FSK). FSK is somewhat more efficient than the simpler ASK (Amplitude-Shift Keying) where the RF carrier is simply on or off. The rfPIC12F675 is capable of either. Transmitter 208 may be as little as a single RF transistor and supporting passive components. Transmitter 208 typically is combined with a crystal 204 to precisely fix the transmitted carrier frequency. In the rfPIC12F675 crystal 204 operates at 1/16 of the carrier frequency, being multiplied up by a PLL (Phase-Locked-Loop) within the chip. In the single-transistor implementation crystal 204 directly supplies the carrier frequency as a harmonic. Some transmitters go without any crystal 204, which requires hand-tuning each unit and considerably more frequency tolerance.

Loop antenna 206 radiates the RF signal. It is a wide trace around the periphery of the printed circuit board just under front surface 105 of miniature remote controller 100. Passive C and L components (not shown) resonate antenna 206 at the selected carrier frequency for efficiency. The single-transistor, no crystal, transmitter 208 implementation mentioned above may use antenna 206 as part of its tank circuit.

Table 1 below lists examples of the possible commands that may be transmitted by miniature remote controller 100, along with their meaning, the user action each requires, and the action the receiver will take if not otherwise clear. "Soft transition" refers to turning a light on or off gradually. "Slewing" refers to the user holding down a button until the light reaches the brightness she desires. Note that the transmitter does not transmit continuously when a button is held down, to conserve power, instead transmitting only a brief start and stop command. PRESET is the user's preferred light level, which the receiver interprets as the last level she slewed to. Empirically determined timing constants, preloaded at manufacture and identified at the bottom of Table 1, help infer user intensions.

The command list of Table 1 is by way of illustration only. It will be appreciated that relatively minor software changes can add new commands or modify the ones listed to meet changing requirements.

TABLE 1

Transmitted Commands

| Command Transmitted | User Action | Meaning | Comments |
|---|---|---|---|
| 0. LINK | hold U + D (>T_link) | Link or Unlink | Transmitter must be near receiver to be linked or unlinked to it. |
| 1. TURNON | tap U (<T_hold) | Soft transition to PRESET or full ON | to PRESET if level < PRESET to full ON if level ≧ PRESET |
| 2. TURNOFF | tap D (<T_hold) | Soft transition to full OFF | |
| 3. SLEWUP | hold U (>T_hold) | Begin slewing UP | brighter |
| 4. SLEWDN | hold D (>T_hold) | Begin slewing DOWN | dimmer |
| 5. STOPUP | release U | Stop slewing UP | TX suppressed if U was held > T_slew |
| 6. STOPDN | release D | Stop slewing DOWN | TX suppressed if D was held > T_slew |
| 7. FLASH | tap U+ D twice | Start flashing | Flashes 0-100% brightness. Any key stops the flashing. |
| 8. CODE0 | tap U + D then tap D before T_gap | Special code 0 | UNDOCUMENTED |
| 9. CODE1 | tap U + D then tap U before T_gap | Special code 1 | UNDOCUMENTED |

Buttons
U = UP button
D = DOWN button
U + D = both buttons pressed together
Constants:
T_bounce Duration of button release that is ignored (e.g. 0.05 sec)
T_hold Duration button interpreted as holding button rather than tapping it (e.g. 0.5 sec)
T_link Duration both buttons held before "LINK" command issued (e.g. 2 sec)
T_slew Maximum slew duration (e.g. 4 seconds)
T_gap Maximum gap allowed between associated actions (e.g. 1.5 sec)

All commands transmitted twice with checksum.

Table 2 is the state diagram used by the transmitter software residing in processor 210 to implement the command list of Table 1. Note that commands from the Command List are issued on transitions from one state to another. For clarity, some states are combined in this table. For example, "one button pressed" is really two states: "UP button pressed" and "DOWN button pressed."

State 4, "responsive slew mode," is explained. Ideally, when the user desires a particular brightness she holds down the appropriate button until it is reached and stops. In practice, however, she is likely to overshoot and/or want to go back and forth to find the exact level desired. The software detects this situation and goes into 'responsive slew state.' In this state, a tap of a button is interpreted as a brightness tweak rather than a turn-on or turn-off and the response is a fraction of a second faster.

TABLE 2

Transmitter State Diagram

| State | Name | Exit condition | # | Exit action | Next |
|---|---|---|---|---|---|
| STATE 0 | Both buttons unpressed (Standby) | either* button pressed | 1 | start timer: t = 0 | STATE 1 |
| STATE 1 | One* button pressed | both buttons released for Δt ≧ T_bounce | 0 | transmit: TURNON or TURNOFF | STATE 0 |
| | | both buttons pressed | 2 | none | STATE 2 |
| | | t ≧ T_hold | 1 | transmit: SLEWUP or SLEWDN | STATE 3 |

TABLE 2-continued

Transmitter State Diagram

| State | Name | Exit condition | # | Exit action | Next |
|---|---|---|---|---|---|
| STATE 2 | Both buttons pressed | either* button released for Δt ≥ T_bounce; t ≥ T_hold | 1 | none | STATE 6 |
| | | both buttons released for Δt ≥ T_bounce; t < T_hold | 0 | none | STATE 5 |
| | | t ≥ T_program | 2 | transmit: LINK | STATE 6 |
| STATE 3 | One* button held | this* button released for Δt ≥ T_bounce | 0 | if t < T_slew: transmit: STOPUP or STOPDN | STATE 4 |
| | | other* button also pressed | 2 | if t < T_slew: transmit: STOPUP or STOPDN | STATE 4 |
| STATE 4 | Responsive slew mode | both buttons released for Δt ≥ T_hold | 0 | none | STATE 0 |
| | | one* button only pressed Δt ≥ T_bounce | 1 | transmit: SLEWUP or SLEWDN restart timer: t = 0 | STATE 3 |
| STATE 5 | Both buttons tapped once | t ≥ T_gap | 0 | none | STATE 6 |
| | | one* button only pressed and then released | 1 | transmit: CODE0 or CODE1 | STATE 6 |
| | | both buttons pressed | 2 | transmit: FLASH | STATE 6 |
| STATE 6 | Wait for complete release | both buttons released for Δt ≥ T_hold | 0 | none | STATE 0 |

"#" in Table 2 above means the number of buttons pressed to exit that State.
* Identity of button is a sub-state not differentiated for clarity.
Variables:
t timer elapsed time
Constants:
T_bounce Duration of button release that is ignored (e.g. 0.02 sec)
T_slew Maximum slew duration (e.g. 4 sec)
T_hold Duration interpreted as holding button rather than tapping it (e.g. 0.5 sec)
T_link Duration both buttons held before "LINK" command issued (e.g. 2 sec)
T_gap Maximum gap allowed between associated actions (e.g. 1.5 sec)

All of the above descriptions are intended by way of example only.

List of Reference Numerals

| | | | |
|---|---|---|---|
| 1 | adapter | 2 | antenna |
| 4 | insulating hand ring | 6 | solder contact |
| 8 | male shoulder | 10 | male threads |
| 12 | standoff and electrical interconnect | 14 | male base |
| 16 | insulating support | 18 | male center contact |
| 20 | standoff and electrical interconnect | 22 a, b, c | printed circuit boards |
| 24 a, b, c, d, e | representations of printed circuit board components | | |
| 26 | flex circuit interconnection | | |
| 28 | representation of embedded electronic components | | |
| 29 | electrical connection | | |
| 30 | folded-spring center contact | 32 | insulating support |
| 34 | female threads | 36 | unthreaded collar of female socket |
| 38 | female socket | 42 | snap for affixing reversible ring |
| 44 | reversible ring | 46 | color code |
| 48 | proximity object | 50 | proximity sensor |
| 52 | wire | 54 | wire |
| 60 | light bulb base | | |
| 62 | unthreaded collar of light bulb socket | | |
| 64 | light bulb socket | 66 | center contact of light bulb socket |
| 67 | center contact of light bulb base | 68 | adapter |
| 70 | female thread peak | 72 | raceway for roller axle |
| 74 | roller axle | 76 | finger release direction |
| 78 | finger release roller with rubber surface | 80 | slot in shell for roller |
| 82 | adapter shell | 84 | male thread valley |
| 86 | point of engagement | 88 | light bulb base |
| 90 | male threads | 92 | female threads |
| 96 | retaining mechanism | | |
| 100 | miniature remote controller | | |
| 102 | up button | 104 | designation of up button |
| 106 | down button | 110 | off-only controller |
| 116 | battery | 118 | transmitter housing |
| 120 | selector switch | 122 a, b | slot structures |
| 124 a, b, c | tic marks for selector switch | 130 | plastic slider |
| 132 | roughened rear surface | 134 a and b | rib structures |
| 140 | adhesive assembly | 142 a and b | backing paper |
| 144 | adhesive | 146 | removal tab |
| 164 | signal conditioning | 166 | receiver chip |
| 168 | power supply | 170 | large resistor |
| 172 | TRIAC | 174 | isolation transistor |
| 176 | processor | 178 | non-volatile memory |
| 180 | error detection & correction | 182 | determine command type |
| 184 | check RF signal strength | 186 | check ID number |
| 188 | execute received command | 190 | record brightness in NVM |
| 192 | check ID number | 194 | add ID number to list |
| 196 | acknowledge LINK | 198 | delete ID number from list |
| 199 | acknowledge UNLINK | 200 | battery-less power system |
| 204 | quartz crystal | 206 | loop antenna |
| 208 | transmitter chip or circuit | 210 | processor |
| 212 | stored ID number(s) | | |

We claim:

1. An adapter for a light bulb socket comprising:
an adapter socket incorporating engageable female threads configured to receive a light bulb base incorporating male threads, the adapter socket having a open end and a closed end, wherein all the engageable female threads of the adapter socket could be engaged by male threads of a fully inserted industry standard light bulb base;
an adapter base incorporating male threads that is configured to be inserted into a light bulb socket that has female threads;
an internal center contact within said adapter socket that is configured to make electrical contact with a center contact of said light bulb base when the light bulb base is fully inserted into said adapter socket;
a center contact of said adapter base that is configured to make electrical contact with a center contact of the light bulb socket when fully inserted therein;
an insulating hand-ring externally surrounding said engageable female threads of said adapter socket which, at a first end, extends axially beyond the open end of said engageable female threads and which, at a second end, extends axially only partially over an external surface of said engageable female threads of said adapter socket leaving a remaining area of the external surface of said engageable female threads uncovered; and wherein said engageable female threads of the adapter socket and said male threads of the adapter base are coaxial, substantially contiguous, electrically connected, and are of the same industry standard screw type and designation number, and such that when said adapter base is fully inserted in the light bulb socket, the uncovered external surface of the female threads is configured to fit into an insulating unthreaded collar at a mouth of the light bulb socket thereby shortening a displacement of said center contact of a light bulb base when fully inserted into the adapter socket from said center contact of said light bulb socket.

2. The adapter of claim 1 wherein the displacement of a center of said light bulb base when fully inserted into the adapter socket from said center contact of the light bulb socket is within two millimeters of a minimum possible displacement consistent with industry standards for said adapter socket and said adapter base.

3. The adapter of claim 1 further including a plurality of interconnected electronic subsystems configured to control electrical output of said adapter, wherein a first electronic subsystem resides between said internal center contact and said external center contact, and a second electronic subsystem resides within said insulating hand-ring.

4. The adapter of claim 3 and further comprising a flex circuit strip configured to provide at least one electrical connection between the first and second electronic subsystems, and wherein said flex circuit strip is recessed sufficiently into the adapter socket so as not to significantly increase the outside diameter of said uncovered external surface of the female threads without significantly impinging on functions of the female threads.

5. The adapter of claim 1 further comprising at least one of an electronic subsystem configured to receive a signal from a remote transmitter and an electronic subsystem configured to transmit a signal to a remote receiver.

6. The adapter of claim 1 wherein said female threads of said adapter socket are synchronized with said male threads of said adapter base.

7. An adapter for a light bulb socket comprising:
an adapter socket incorporating female threads configured to receive a light bulb base incorporating male threads, the adapter socket having a open end and a closed end;
an adapter base incorporating male threads that is configured to be inserted into a light bulb socket that has female threads;
an internal center contact within said adapter socket that is configured to make electrical contact with a center contact of said light bulb base when the light bulb base is fully inserted into said adapter socket;
a center contact of said adapter base socket that is configured to make electrical contact with a center contact of the light bulb socket when fully inserted therein;
an insulating hand-ring externally surrounding said female threads of said adapter socket which, at a first end, extends axially beyond the open end of said adapter socket and which, at a second end, extends axially only partially over said female threads of said adapter socket; and a thin insulating layer covering at least in part an area externally surrounding said female threads of said adapter socket axially proximate said second end of said insulating hand-ring;

wherein said female threads of the adapter socket and said male threads of the adapter base are coaxial, substantially contiguous, electrically connected, and are of the same industry standard screw type and designation number, and such that when said adapter base is fully inserted in the light bulb socket, and said area externally surrounding said female threads covered at least in part by said thin insulating layer fits into an insulating unthreaded collar at a mouth of a light bulb socket thereby shortening a displacement of said center contact of a light bulb base when fully inserted into the adapter socket from said center contact of said light bulb socket.

8. The adapter of claim 7, wherein the displacement of a center of said light bulb base when fully inserted into the adapter socket from said center contact of the light bulb socket is within two millimeters of a minimum possible displacement consistent with industry standards for said adapter socket and said adapter base.

9. The adapter of claim 7, further comprising at least one of an electronic subsystem configured to receive a signal from a remote transmitter and an electronic subsystem configured to transmit a signal to a remote receiver.

10. The adapter of claim 7 wherein said female threads of said adapter socket are synchronized with said male threads of said adapter base.

11. The adapter of claim 7, wherein there is substantially no axial gap between functional female threads of said adapter socket and functional male threads of said adapter base.

12. An adapter for a light bulb socket comprising:
an adapter socket incorporating female threads configured to receive a light bulb base incorporating male threads; and
an adapter base incorporating male threads and a male shoulder region above the male threads, said adapter base configured to be inserted into a light bulb socket incorporating female threads;
wherein said adapter socket and said adapter base are coaxial and partially overlapping and are of the same industry standard screw type and designation number, and at least one-half turn of a functional female thread of said adapter socket overlaps said male shoulder region of said adapter base and is configured to fall fully within an unthreaded collar at a mouth of said light bulb socket when said adapter base is fully inserted therein, thereby shortening a displacement of said light bulb base from said light bulb socket.

13. The adapter of claim 12 wherein there is no axial gap between functional female threads of said adapter socket and functional male threads of said adapter base.

14. The adapter of claim 12 wherein said female threads of said adapter socket are synchronized with said male threads of said adapter base.

15. The adapter of claim 12 further comprising a folded-spring center contact in said adapter socket, wherein the folded spring is configured to fold back on itself at least once thereby providing electrical contact with said light bulb base to satisfy industry standards when said light bulb base is fully inserted into said adapter socket.

16. The adapter of claim 12 further comprising a locking mechanism configured to at least inhibit removal of said light bulb base from said adapter such that said adapter remains with said light bulb base and not with said light bulb socket when said light bulb base is unscrewed from said light bulb socket.

17. The adapter of claim 16 further comprising a manual mechanism configured to temporarily disable the locking mechanism to allow said adapter to be transferred to another light bulb.

18. The adapter of claim 12 further including:
- a first electronic subsystem located within said adapter base;
- a second electronic subsystem located above said male shoulder region, wherein said second electronic subsystem is external to said light bulb socket when said adapter base is fully inserted therein; and
- a flex circuit strip configured to electrically connect said first and said second electronic subsystems, wherein said flex circuit strip is recessed sufficiently into an outside surface of said adapter said male shoulder so as not to significantly increase an outside diameter of said male shoulder and without significantly impinging on functional female threading on an underside of said male shoulder.

19. An adapter for a light bulb socket comprising:
- an adapter socket incorporating female threads configured to receive a light bulb base incorporating male threads;
- an adapter base incorporating male threads configured to be inserted into a light bulb socket incorporating female threads;
- an insulating hand-ring that at least partially surrounds said adapter socket;
- electronic control circuitry that is configurable to control an electrical output of said adapter;
- a reversible ring having two sides;
- means for affixing said reversible ring to an open end of said insulating hand-ring in order to allow said reversible ring to be removed from, inverted, and re-affixed to said open insulating hand-ring; and
- means for detecting and responding to an orientation of said reversible ring;
- wherein said electronic control circuitry is user configurable to operate in one of two operating modes based on the orientation in which the reversible ring is mounted on the open end of the insulating hand-ring.

20. The adapter of claim 19, wherein the two sides of the reversible ring are visually distinguishable.

\* \* \* \* \*